United States Patent
Doshi et al.

(10) Patent No.: US 12,399,781 B2
(45) Date of Patent: Aug. 26, 2025

(54) METHODS AND APPARATUS TO INCREASE RESILIENCY IN SELF-HEALING MECHANISMS

(71) Applicant: Intel Corporation, Santa Clara, CA (US)

(72) Inventors: Kshitij Arun Doshi, Tempe, AZ (US); Francesc Guim Bernat, Barcelona (ES); Christian Maciocco, Portland, OR (US); Satish Jha, Portland, OR (US); Vesh Raj Sharma Banjade, Portland, OR (US); S M Iftekharul Alam, Hillsboro, OR (US); Alexander Bachmutsky, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 824 days.

(21) Appl. No.: 17/484,951

(22) Filed: Sep. 24, 2021

(65) Prior Publication Data
US 2022/0012129 A1  Jan. 13, 2022

(51) Int. Cl.
G06F 11/00 (2006.01)
G06F 11/07 (2006.01)
G06F 11/14 (2006.01)

(52) U.S. Cl.
CPC ...... G06F 11/1423 (2013.01); G06F 11/0772 (2013.01); G06F 11/0793 (2013.01); G06F 11/1438 (2013.01)

(58) Field of Classification Search
CPC ............. G06F 11/1423; G06F 11/0772; G06F 11/0793; G06F 11/1438; G06F 11/0781; G06F 11/1441; G06F 11/1443
See application file for complete search history.

(56) References Cited

U.S. PATENT DOCUMENTS

2007/0174361 A1   7/2007  Branda et al.
2009/0217083 A1*  8/2009  Hatasaki ............. G06F 11/2025
                                                              718/1

(Continued)

OTHER PUBLICATIONS

European Patent Office, "Extended European Search Report," issued in connection with Patent Application 22186212.1, dated May 12, 2023, 15 pages.

(Continued)

*Primary Examiner* — Katherine Lin
(74) *Attorney, Agent, or Firm* — HANLEY, FLIGHT & ZIMMERMAN, LLC

(57) ABSTRACT

Methods, apparatus, systems, and articles of manufacture are disclosed to increase resiliency in self-healing mechanisms. At least one non-transitory machine-readable medium comprises instructions that, when executed, cause at least one processor to at least partition computational resources of a first host into a primary partition and a shadow partition, the primary partition to communicate with a second host, apply a fix for the primary partition, determine if the primary partition can communicate with the second host during the application of the fix, cause, in response to the determination that the primary partition cannot communicate with the second host during the application of the fix, the shadow partition to communicate with the second host; and transfer communication with the second host from the shadow partition to the primary partition, the transfer in response to a determination that the application of the fix is complete.

25 Claims, 16 Drawing Sheets

(56) References Cited

U.S. PATENT DOCUMENTS

2013/0185416 A1* 7/2013 Larkin ............... H04L 12/4641
709/224
2014/0095927 A1* 4/2014 Abraham ............... G06F 11/00
714/6.12
2020/0104823 A1* 4/2020 Chan ................... G06Q 20/223

OTHER PUBLICATIONS

European Patent Office, "Partial Search Report," issued in connection with European Patent Application No. 22186212.1, Feb. 2, 2023, 19 pages.

* cited by examiner

METHODS AND APPARATUS TO INCREASE RESILIENCY IN SELF-HEALING MECHANISMS

FIELD OF THE DISCLOSURE

This disclosure relates generally to self-healing mechanisms and, more particularly, to increase resiliency in self-healing mechanisms.

BACKGROUND

In recent years, increased usage of cloud computing environments has led to greater emphasis on the environment's resiliency, or ability to perform reliably. The environment's resiliency relies on the resilience of each mechanism within the computing environment. A mechanism is made more resilient by healing, during which fixes to small and correctible errors are applied. Mechanism healing towards small errors helps prevent larger and more severe errors, which have a greater chance of adversely affecting the performance of the cloud computing environment.

BRIEF DESCRIPTION OF THE DRAWINGS

The figures are not to scale. In general, the same reference numbers will be used throughout the drawing(s) and accompanying written description to refer to the same or like parts.

Figure 1:
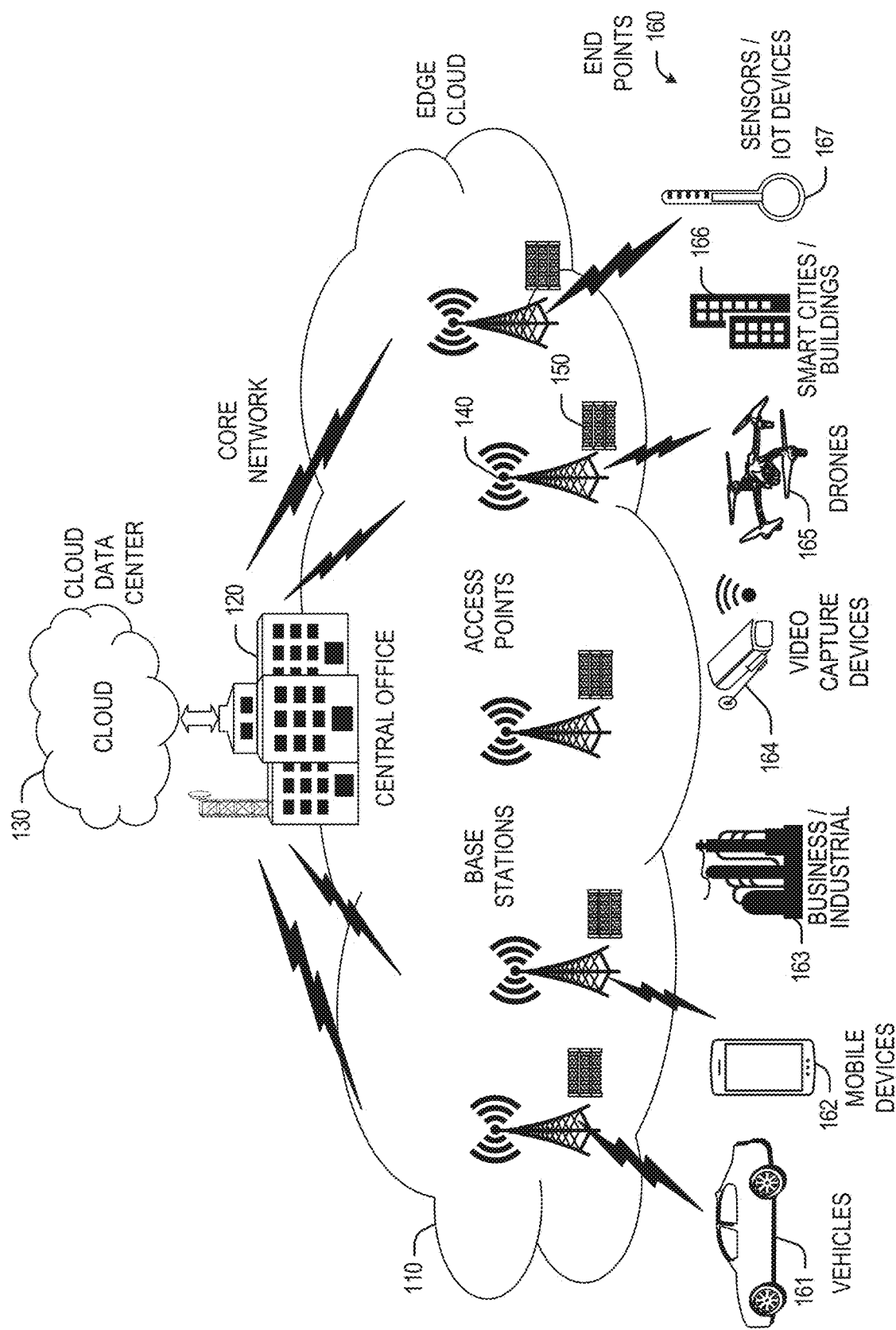
FIG. 1 illustrates an overview of an Edge cloud configuration for Edge computing.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many cloud computing environments may utilize self-healing mechanisms to increase efficiency. A self-healing mechanism is a device within a cloud computing environment that can apply a fix to itself without the need for human input. As used herein, a fix is a change and/or instructions for applying the change for correcting an issue, error, or bug within a device. A self-healing mechanism may identify a fix itself or receive a fix from a different device within the cloud computing environment.

Often, a self-healing mechanism may identify or receive a proposed fix. A proposed fix for an issue is a fix (e.g., a change and/or instructions for applying the change) that is not guaranteed to be successful in correcting the issue. These proposed fixes may be common in cloud computing environments that execute many multi-tenant applications with various dependencies.

Self-healing mechanisms that apply a proposed fix may experience adverse effects if the fix is unsuccessful. In addition to the original issue remaining unresolved, the proposed fix may cause the self-healing mechanism to become less stable than the state of the self-healing mechanism before the application of the proposed fix. This instability may negatively affect the performance of one or more tasks executed by the self-healing mechanism. Examples of a device becoming less stable include but are not limited to one or more applications or services running on the device to freeze, crash, and/or generally not function properly. Additionally or alternatively, the instability may result in the self-healing mechanism restarting one or more times, and/or losing connection with peripheral devices such as those in the cloud computing environment.

Examples described herein detail a self-healing mechanism that remains connected to the cloud computing environment and executing tasks during the application of a proposed fix, even when the proposed fix would have caused instability in a self-healing mechanism using previous solutions. In doing so, examples described herein increase the resiliency of self-healing mechanisms.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
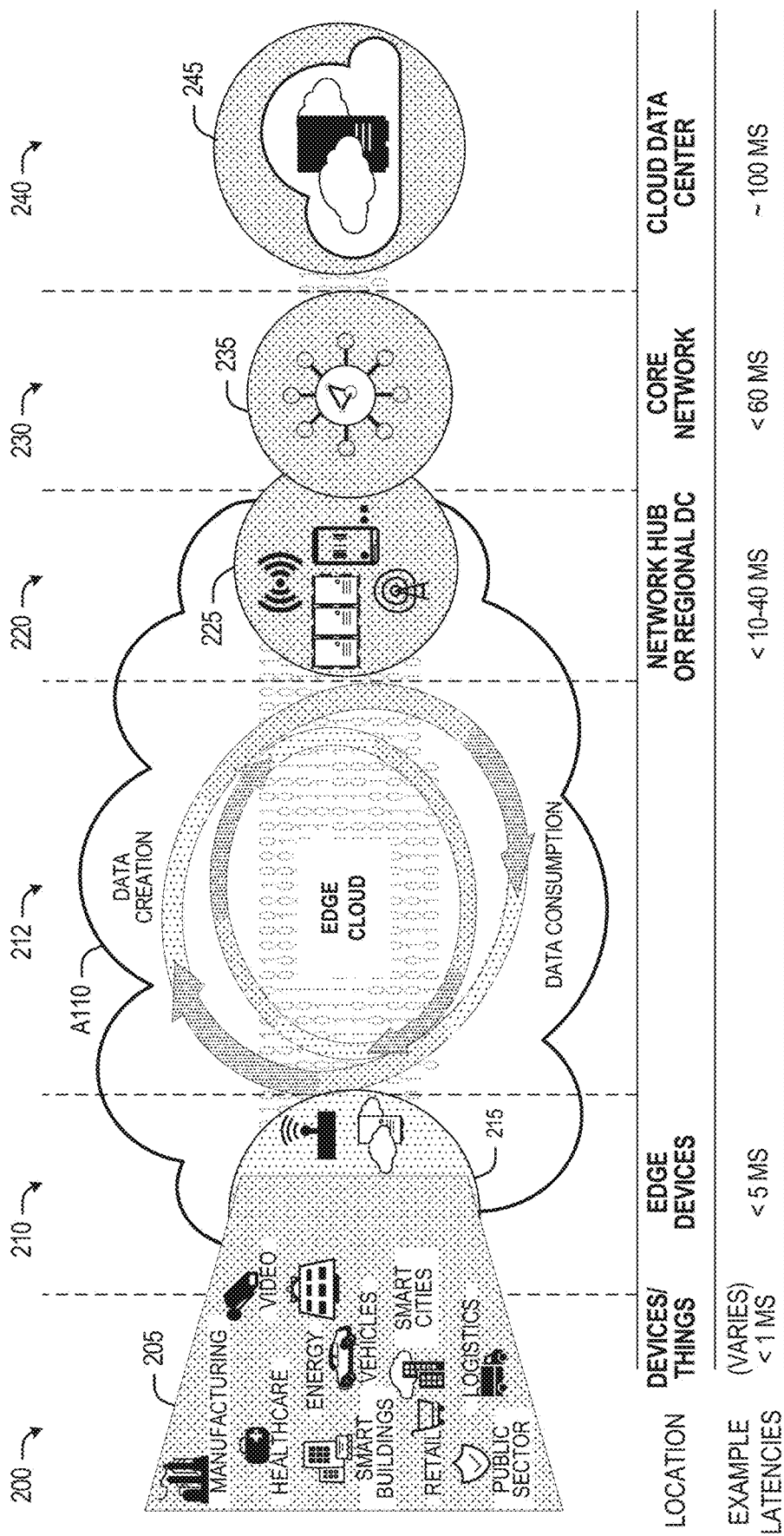
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The Edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
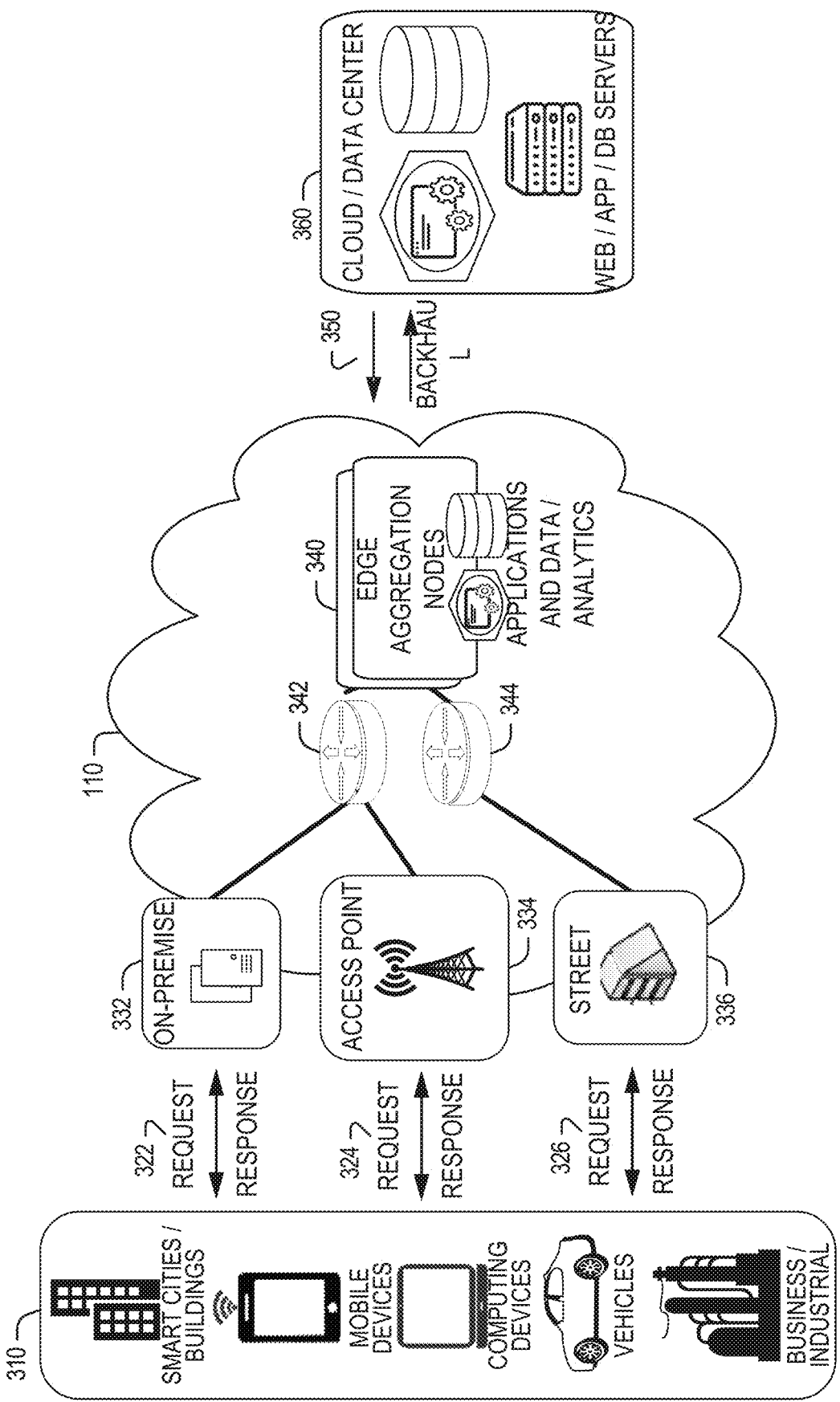
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., a cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
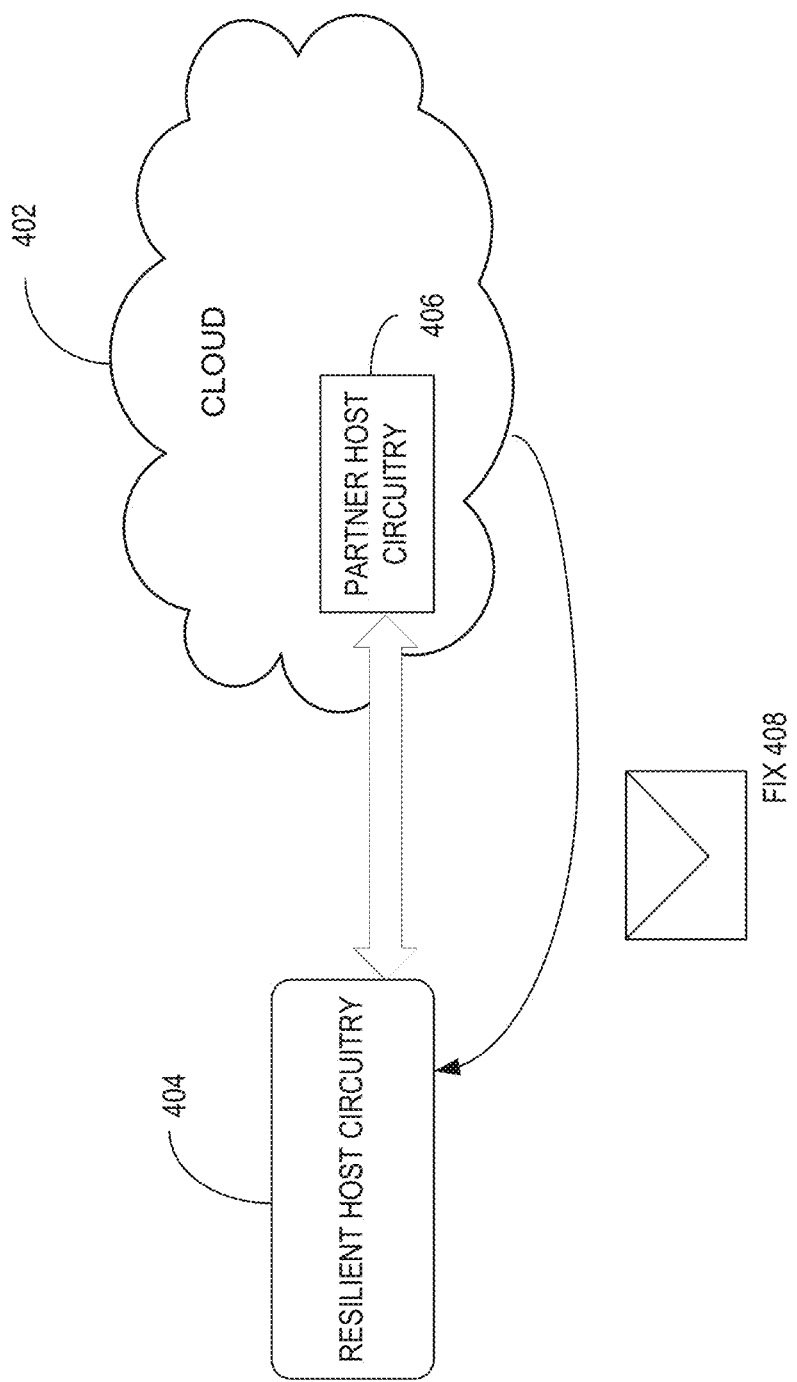
FIG. 4 is an illustrative example of an example computing environment.

FIG. 4 is an illustrative example of an example computing environment. The example environment 400 includes a cloud 402, example resilient host circuitry 404, partner host circuitry 406, and a fix 408.

The cloud 402 of FIG. 4 is a group of devices that are connected via a network. In some examples, the network is the Internet. Devices in the cloud 402 create, store, manage, and process data amongst themselves. By doing so, devices in the cloud 402 can perform tasks at a larger and more efficient scale than if the tasks were performed outside of the cloud 402.

In some examples, the devices in the cloud 402 perform tasks according to an assigned priority. In some such examples, higher priority tasks assigned to a given device are performed before lower priority tasks assigned to the same device. The priority of a task may be context specific. In some examples, the priority of an example task may be assigned by the device performing the task, by another device in the cloud 402, or by a user that interfaces with one or more devices in the cloud 402.

The example resilient host circuitry 404 of FIG. 4 employs self-healing with increased resiliency, as taught by the examples of this disclosure. The example resilient host circuitry 404 connects to the cloud 402 and may execute any number of tasks. These tasks may be executed locally or using the cloud 402. Within the example environment 400, the highest priority task of the example resilient host circuitry 404 is to communicate with the partner host circuitry 406 via the cloud 402. As used herein, "communication"

refers to the sending and receiving of data between two devices. The communication between example resilient host circuitry 404 and partner host circuitry 406 may be for any purpose. In some examples, the communication is transmitted as a result of execution of a software application.

The fix 408 of FIG. 4 is a method of correcting an issue, error, or bug within the example resilient host circuitry 404. For simplicity, the term "issue" is used herein to collectively refer to any configuration, issue, error, or bug that a fix attempts to correct. The issue within the example resilient host circuitry 404 may occur for any reason. The issue may adversely affect one or more of the tasks executed by the example resilient host circuitry 404, including but not limited to the communication with partner host circuitry 406. Further, the fix 408 may take any form. Example fixes include but are not limited to restarting a software application or computational resource, updating a driver or software application to a more recent (e.g., the latest) version, adjusting parameters within a network communication protocol, etc.

Within the example environment 400, the example resilient host circuitry 404 receives the fix 408 from a device in the cloud 402. In some examples, the fix 408 is sent from the partner host circuitry 406. In other examples, the fix 408 is sent from a different device. While not illustrated in FIG. 4 for simplicity, the example resilient host circuitry 404 may additionally or alternatively identify the fix 408 through self-diagnosis. While FIG. 4 shows a singular fix 408 for simplicity, any number of fixes may be received or identified by the example resilient host circuitry 404.

The example resilient host circuitry 404 applies the fix 408 while continuing to communicate with the partner host circuitry 406. Because fixes can inadvertently cause adverse effects, the fix 408 may cause a decrease in performance from a host using previous self-healing mechanisms. The fix 408 may also cause a host using previous self-healing mechanisms to either temporarily or permanently lose communication with the cloud 402. By employing the teachings of this disclosure, the example resilient host circuitry 404 mitigates potentially adverse effects of the fix 408, thereby increasing resiliency.

Figure 5:
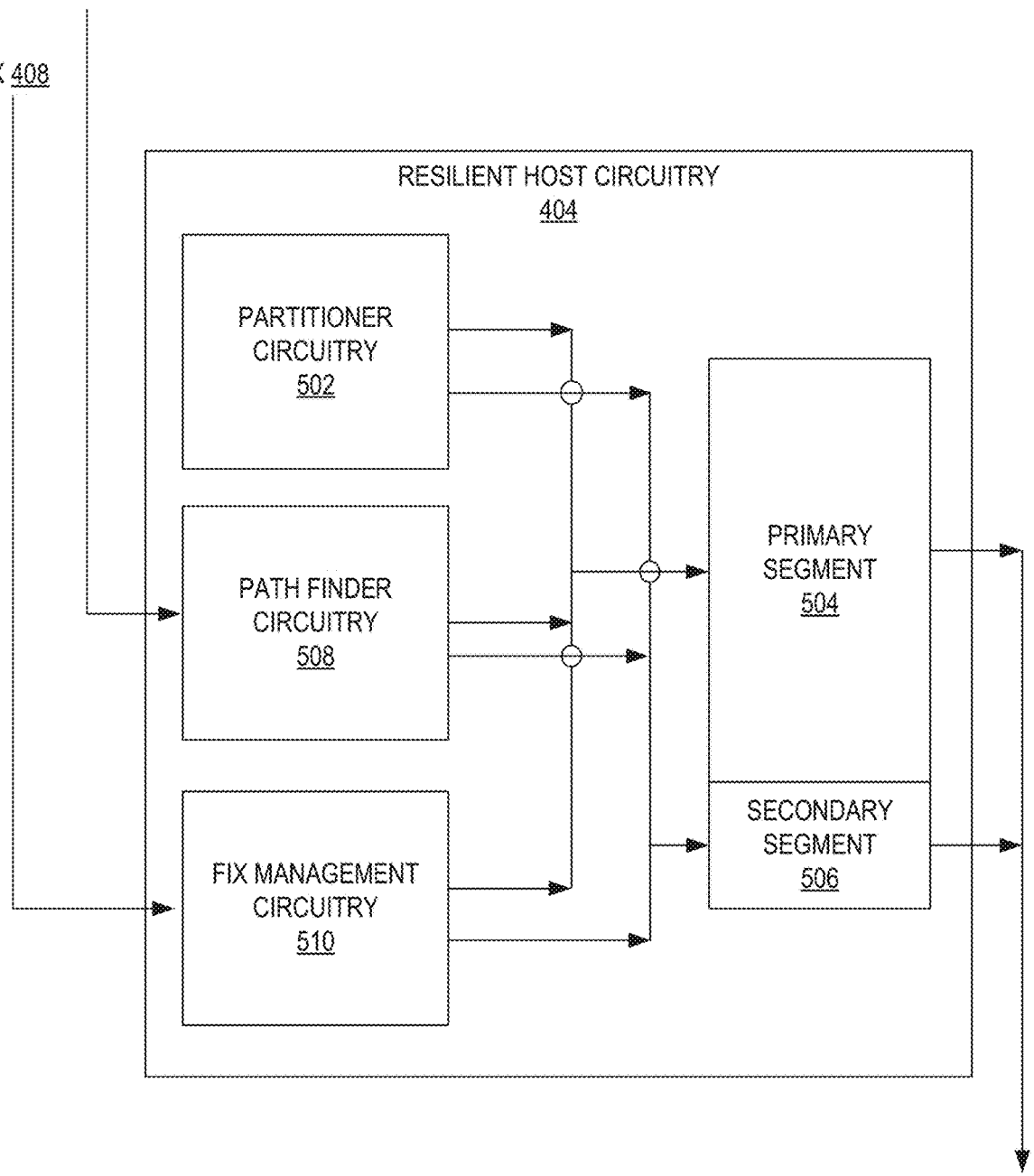
FIG. 5 is a block diagram of an example implementation of the host circuitry of FIG. 1

FIG. 5 is a block diagram of an example implementation of the resilient host circuitry of FIG. 4. The example resilient host circuitry includes example partitioner circuitry 502, an example primary segment 504, an example secondary segment 506, example path finder circuitry 508, and example fix management circuitry 510.

The example partitioner circuitry 502 of FIG. 5 partitions the computational resources of the example resilient host circuitry 404 into an example primary segment 504 and an example secondary segment 506. In some examples, a segment may be referred to as a "portion", "partition", or "division". The example partitioner circuitry 502 makes the partition so that the example primary segment 504 has a larger portion of the computational resources than the example secondary segment 506. The example partitioner circuitry 502 also makes the partition so that the example primary segment 504 and example secondary segment 506 can execute tasks independently of one another.

The partition of computational resources may be context specific. In some examples, the division may depend on what computational resources are available within the example resilient host circuitry, the type and content of communication with the partner host circuitry 406, and/or other tasks executed by the example resilient host circuitry 404. In another example, the partitioning may take into account capability for a secondary segment to be re-used across multiple primary segments to reduce the need for unnecessary replication of identical secondary segments. In case of re-use and already existing secondary segment, the example partitioner circuitry 502 may point to such example secondary segment instead of creating the new one.

In some examples, the example resilient host circuitry 404 includes means for partitioning. For example, the means for partitioning may be implemented by example partitioner circuitry 502. In some examples, the example partitioner circuitry 502 may be implemented by machine executable instructions such as that implemented by at least blocks 1002 of FIG. 10 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example partitioner circuitry 502 is implemented by other hardware logic circuitry, hardware implemented state machines, and/or any other combination of hardware, software, and/or firmware. For example, the example partitioner circuitry 502 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example primary segment 504 of FIG. 5 represents a large portion of the computational resources of the example resilient host circuitry 404. The example primary segment 504 may include multiple processing units, physical system memory, a full operating system, drivers, run time environments, software containers, network interface cards or virtual functions or ports within network interface cards, software applications and services, etc. The example primary segment 504 performs most tasks that the example resilient host circuitry 404 is responsible for, including communication with the partner host circuitry 406.

The example secondary segment 506 of FIG. 4 is a small portion of the computational resources of the example resilient host circuitry 404. The example secondary segment 506 may include one or a small number of processing units, a small amount of reserved memory, access to a virtual function on a network interface card, and/or access to a low performance Local Area Network (LAN). Examples of a low performance LAN may be used by the INTEL MANAGEMENT ENGINE® or by INTEL ACTIVE MANAGEMENT TECHNOLOGY®. The example secondary segment 506 works to support the primary segment if a fix 408 needs to be applied. When a fix has not been received or has not been identified, the example secondary segment 506 may perform low priority tasks that the example resilient host circuitry 404 is responsible for. In some examples, the example secondary segment 506 may be referred to as a "shadow", "backup", or "watch dog" segment.

The example path finder circuitry 508 of FIG. 5 finds paths of communication through the cloud 402. A path is an ordering of devices or network switches in the cloud 402 through which information is sent. By transmitting data between devices along a path, a first device and a second device can communicate with one another without the need for a physical connection. The example path finder circuitry 508 finds a first path between the example primary segment 504 and partner host circuitry 406. The example path finder circuitry 508 also finds a second path between the example secondary segment 506 and the partner host circuitry 406.

The example path finder circuitry 508 may find any number of additional paths that may be utilized by the example primary segment 504 and/or example secondary segment 506 to communicate with the partner host circuitry 406.

In some examples, the example path finder circuitry 508 may find additional paths for both the example primary segment 504 and example secondary segment 506 throughout the duration of the example process 900. In other examples, additional paths are found in specific cases such as when an issue with a path is identified (or such issue is expected in near future). In some examples, the fix management circuitry 510 may consider duplicating packets over first path and the second path until the first path recovered from the detected instability, while in another cases packet forwarding is switched to the second path once instability is detected in the first path. Proactive discovery and maintenance of additional paths may be critical for devices on the cloud 402. If there are multiple channels of communication through the first path and additional paths are not sufficient to handle switching of all channels, the example path finder circuitry 508 module may penalize some of the low priority channels or buffer packets from channels which are not delay sensitive and can tolerate delay for a known time that is less than expected instability time of the first path.

In some examples, the example resilient host circuitry 404 includes means for finding a path. For example, the means for finding may be implemented by example path finder circuitry 508. In some examples, the example path finder circuitry 508 may be implemented by machine executable instructions such as that implemented by at least blocks 1004 of FIG. 10 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example path finder circuitry 508 is implemented by other hardware logic circuitry, hardware implemented state machines, and/or any other combination of hardware, software, and/or firmware. For example, the example path finder circuitry 508 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example fix management circuitry 510 of FIG. 5 receives or identifies the fix 408 and applies the fix 408 to the example primary segment 504. The fix management circuitry also ensures that communication between the example resilient host circuitry 404 and the partner host circuitry 406 continues during the application of the fix.

While in examples disclosed herein, the fix 408 is applied to the primary segment 504, in some examples, the fix may additionally or alternatively be applied to the secondary segment 506. In some such examples, the application of the fix 408 to the example primary segment 504 and the application of the fix 408 to the example secondary segment 506 do not occur concurrently. Rather, the application of fix 408 may complete on one segment before the application of the fix 408 begins on the other segment. By applying the fix 408 to the example primary segment 504 and example secondary segment 506 at different times, the example fix management circuitry 510 avoids the risk of the fix 408 having adverse effects on both segments and causing the example resilient host circuitry 404 to lose communication with the partner host circuitry 406. The example fix management circuitry 510 is explored further in FIGS. 9-12.

In some examples, the example resilient host circuitry 404 includes means for applying, means for determining, means for causing, and means for transferring. For example, the means for applying, means for determining, means for causing, and means for transferring may be implemented by fix management circuitry 510. In some examples, the fix management circuitry 510 may be implemented by machine executable instructions such as that implemented by at least blocks 1006, 1008, and 1010 of FIG. 10, blocks 1102 and 1106 of FIG. 11, and blocks 1204 through 1216 in FIG. 12 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the fix management circuitry 510 is implemented by other hardware logic circuitry, hardware implemented state machines, and/or any other combination of hardware, software, and/or firmware. For example, the fix management circuitry 510 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Prior to the application of the fix 408, the example resilient host circuitry 404 practices normal communication. During normal communication, the example primary segment 504 communicates with the partner host circuitry 406 using the first path, the example secondary segment 506 may perform low priority tasks, and the example fix management circuitry 510 takes precautionary measures to prepare for the fix 408. Normal communication is explored further in FIGS. 10 and 11

Once the fix 408 is received or identified, the application of the fix 408 to the example primary segment 504 may have adverse effects that cause the example primary segment 504 to be unable to communicate with the partner host circuitry 406. In this example scenario, the fix management circuitry 510 enables the example secondary segment 506 to take over communication with the partner host circuitry 406 using the second path. This communication with the example secondary segment 506 continues until the application of the fix 408 is complete and the example primary segment 504 regains the ability to communicate with the partner host circuitry 406. The example resilient host circuitry 404 exhibits increased resiliency by continuing to communicate with the partner host circuitry 406 even when the fix 408 has adverse effects that would traditionally disable said communication in previous solutions to self-healing mechanisms.

In the example block diagram of FIG. 5, the example partitioner circuitry 502, example path finder circuitry 508, and example fix management circuitry 510 are illustrated as separate entities from the example primary segment 504 and example secondary segment 506. In some examples, the example partitioner circuitry 502, example path finder circuitry 508, and example fix management circuitry 510 are not separate entities. In some such examples, the computational resources of the example resilient host circuitry 404 may be divided into an example primary segment 504 and example secondary segment 506 at the time of manufacture or before the device connects to the cloud 402. In some such examples, the example primary segment may identify paths for communication by itself, and the example secondary segment may identify paths for communication by itself. Further, in some such examples, the example fix management circuitry 510 may be implemented within the example secondary segment 506.

Figure 6:
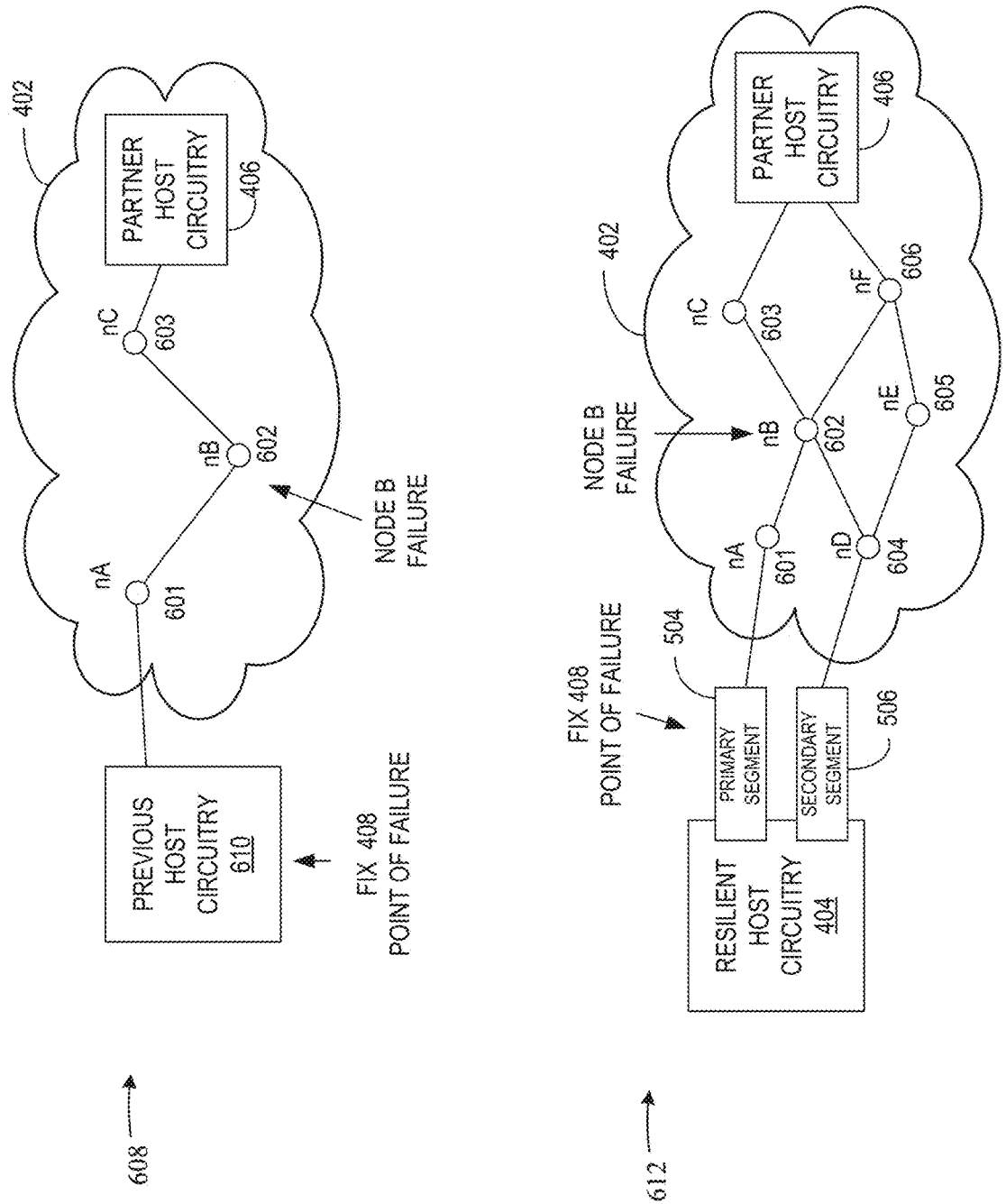
FIG. 6 is an illustrative example of communication using a previous solution and communication using the host1 circuitry of FIG. 4.

FIG. 6 is an illustrative example of communication using a previous solution and communication using the host1 circuitry of FIG. 4. A diagram showing communication using a previous solution 610 includes previous host circuitry 608, numbered nodes 601, 602, and 603, and partner host circuitry 406. A diagram showing communication with increased resiliency 612 includes example resilient host circuitry 404, the example primary segment 504, the example secondary segment 506, numbered nodes 601, 602, 603, 604, 605, 606, and partner host circuitry 406.

In the diagram showing communication using a previous solution 610, previous host circuitry 608 is a device with self-healing through previous solutions. In the illustrative example of FIG. 6, the highest priority task of previous host circuitry 608 is to communicate with the partner host circuitry 406 via the cloud 402, similar to the example resilient host circuitry 404. Said communication occurs through an example path defined by node A 601, node B 602, and node C 603.

In the illustrative example of FIG. 6, both previous host circuitry 608 and the example resilient host circuitry 404 receive or identify a fix 408 that has adverse effects. Additionally, node B 602 experiences a failure in both diagrams. In the diagram showing communication using a previous solution 610, both the fix 408 and node B 602 independently cause the previous host circuitry 608 to lose communication with the partner host circuitry 406.

The diagram showing communication with increased resiliency 612 is an example implementation of the example cloud computing environment 400. In the diagram showing communication with increased resiliency 612, the example partitioner circuitry 502 partitions the computational resources of the example resilient host circuitry 404 into the example primary segment 504 and example secondary segment 506. Additionally, the example path finder circuitry 508 finds the previous path of by node A 601, node B 602, and node C 603 for the example primary segment 504 and a new path for the example secondary segment. In the illustrative example of FIG. 6, the example path finder circuitry identifies two paths available to the example secondary segment for communication with the second path. In some examples, the example path finder circuitry 508 identifies one or more paths for both the example primary segment 504 and the example secondary segment 506.

The path of node D 604, node E 605, and node F 606, does not utilize the failed node B 602. Therefore, by utilizing the example secondary segment 506 along the path of node D 604, node E 605, and node F 606, the example resilient host circuitry 404 exhibits increased resiliency and can continue communicating with the partner host circuitry 406 while the example primary segment 504 experiences adverse effects from the fix 408. Once the application of the fix 408 is complete, the example primary segment 504 regains its ability to communicate with the partner host circuitry 406 and communication is transferred from the example secondary segment 506 to the example primary segment 504.

Before application of the fix 408, communication between the example resilient host circuitry 404 and the partner host circuitry 406 occurs through the example primary segment 504. Therefore, for the example secondary segment 506 to successfully communicate with the partner host circuitry 406, the example fix management circuitry 510 sets the trust levels of the example secondary segment 506 to match that of the example primary segment 504. In some examples, matching a trust level includes setting one or more computational resources in the example secondary segment 506 to have the same security configurations of the associated computational resources of the example primary segment 504. Security configurations may include but is not limited to encryption keys, measured re-boots, secured re-boots, root of trust, attestation protocols, authentication protocols, authorization protocols, etc. The matching of a trust level may be context specific and depend on the computational resources of the example resilient host circuitry 404.

Matching the trust levels between the example primary segment 504 and example secondary segment 506 raises the overall security level of the example resilient host circuitry 404. In doing so, the fix management circuitry 510 may increase the resiliency of the example resilient host circuitry 404 by mitigating a malicious attack that would otherwise have adverse effects due to a lower security level.

In some examples, the role of the example secondary segment 506 may be performed by some or all of the computational resources of a different example resilient host circuitry in the cloud 402. In some such examples, the example resilient host circuitry 404 and the different example host circuitry share a memory pool. A memory pool is a group of memory resources where portions of the memory resources are allocated to individual compute devices or virtual machines (VMs) across the cloud 402 and are dedicated to that particular compute element for the life of the workload. Example systems that employ memory pools may include but are not limited to Compute Express Link™.

In some examples where the role of the example secondary segment 506 may be performed by some or all of the computational resources of an example host D circuitry device in the cloud 402, the example resilient host circuitry 404 may connect wirelessly to the example host D circuitry. In some such examples, the example host D circuitry may take over communication with the partner host circuitry 406 at any layer in a protocol stack. In some such examples, the communication may utilize the Transmission Control Protocol/Internet Protocol (TCP/IP) model and include Multi-Radio Access Technology Dual (multi-RAT) connectivity at the Data Link Layer.

Figure 7:
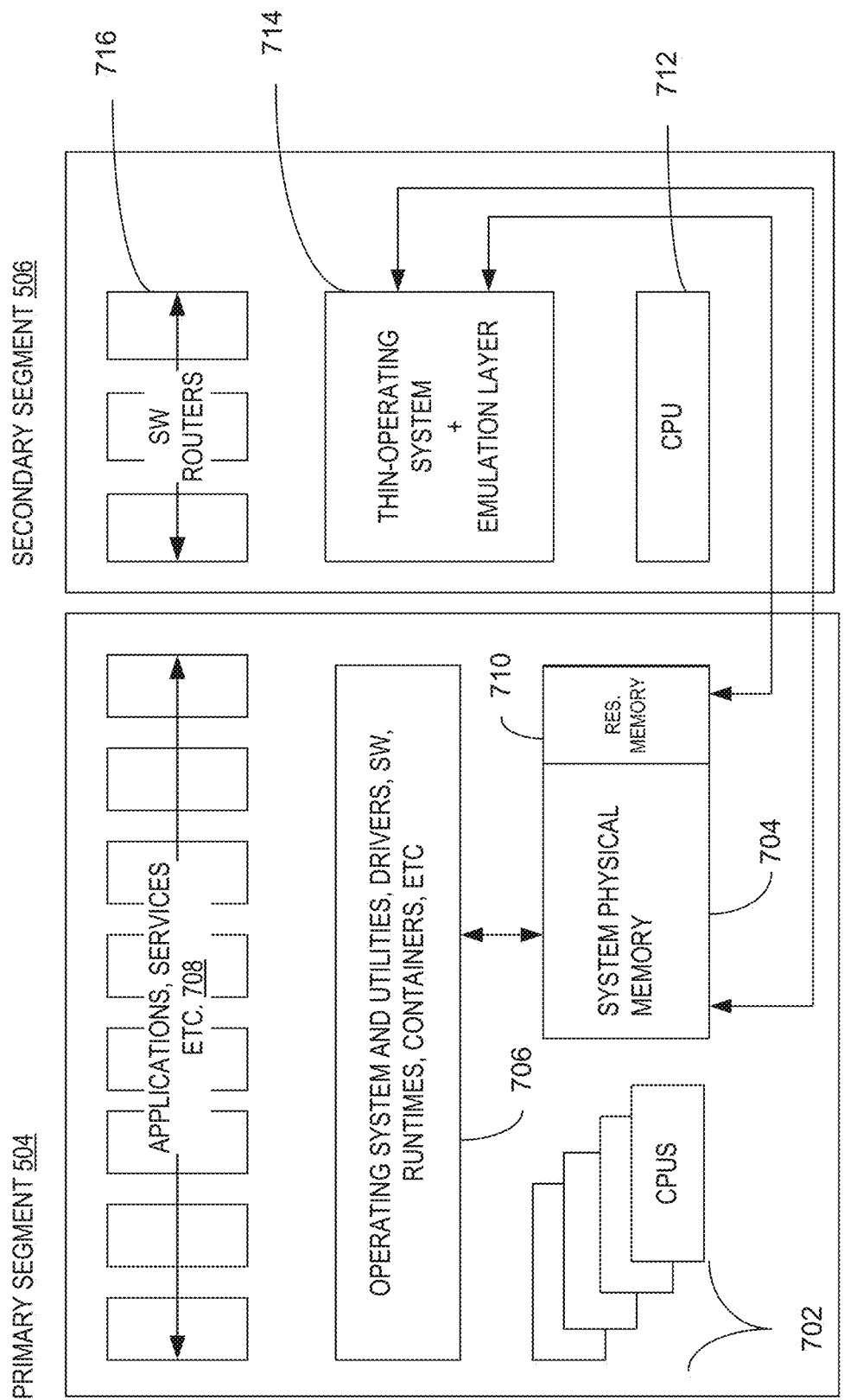
FIG. 7 is a block diagram of an example implementation of the example primary segment and secondary segment of FIG. 5.

FIG. 7 is a block diagram of an example implementation of the example primary segment and secondary segment of FIG. 5. The example primary segment 504 contains processing units 702, system physical memory 704, software architecture 706, and applications and services 708. The example secondary segment 506 contains a processing unit 710, reserved memory 712, a thin software architecture 714, and software routers 716.

The processing units 702 and processing unit 710 may be any type of circuitry that executes instructions. In the example implementation of FIG. 7, the processing units 702 and processing unit 710 are Central Processing Units (CPU). In some examples, the processing units are implemented by one or more of the processing circuitry described by FIGS. 13, 14, and/or 15. There are more processing units 702 in the example primary segment 504 than processing units 702 for the example secondary segment 506. In some examples, the processing units 702 can support 400 logical threads and the processing unit 710 implements a singular logical thread. In some examples, the processing unit 710 of the secondary segment is a singular CPU implementing simultaneous multithreading.

Both the system physical memory 704 and reserved memory 712 may contain volatile memory and non-volatile memory. The volatile memory may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory may be implemented by flash memory and/or any other desired type of memory device. The system physical memory 704 is used to implement the software architecture 706 of the example primary segment 504 and the applications and services 708 of the example primary segment 504. Similarly, the reserved memory 712 is used to implement the software architecture 706 of the example secondary segment 506 and any low priority tasks that the example secondary segment 506 is responsible for. Additionally, both the example primary segment 504 and example secondary segment 506 access the reserved memory 712 during the application of the fix 408. This shared memory access is described further in FIGS. 8, 9, 10, 11, and 12.

The software architecture 706 of the example primary segment 504 may include a full operating system, drivers, run time environments, software containers, etc. The software architecture 706 also give the example primary segment 504 access to Input/Output functionality through the network interface cards, serial communication protocols, etc. The software architecture 706 enables the example primary segment 504 to run the applications and services 708. In contrast, the thin software architecture 714 of the example secondary segment 506 may contain a thin, specialized operating system and supporting emulation layer. The thin software architecture 714 may support the example primary segment 504 during the fix 408 and may perform any additional low priority tasks assigned to the example secondary segment 506.

The software routers 716 connect the example secondary segment 506 to the cloud 402 and enable communication with the partner host circuitry 406. These software routers 716 may be utilize inexpensive nodes that experience high end to end latency, resulting in a lower performance in comparison the lower latency nodes that more expensive network interface cards on the example primary segment 504 can utilize to connect to the partner host circuitry 406. The example partitioner circuitry 502 divides the computational resources to implement this difference in performance as a cost saving measure, as the example secondary segment 506 serves the primary role of supporting the example primary segment 504 during a fix and therefore does not require consistently highly performance.

The example primary segment 504 performs tasks by running the applications and services 708. For example, communication with the partner host circuitry 406 may be implemented through a software application, which is itself constituted by a set of micro-services. The microservices are executed as part of the applications and services 708 by utilizing the processing units 702, system physical memory 704, and software architecture 706. In some examples, other functionality may be achieved through the applications and services 708.

The example partitioner circuitry 502 divides the computational resources of the example resilient host circuitry 404 such that the example primary segment 504 and example secondary segment 506 can operate independently of one another. In doing so, the example secondary segment 506 can continue operating, and the example resilient host circuitry 404 can continue communicating with the partner host circuitry 406, in the event that the fix 408 has adverse effects. For example, the thin operating system in the thin software architecture 714 is restarted independently of the full operating system in the software architecture 706. Furthermore, the thin operating system has its own boot manager configuration that allows enables the thin operating system to determine whether or not to restart the reserved memory 712 and processing unit 710.

Additionally or alternatively, the thin software architecture 714 may specify computational resources using a bitmap stored in a configuration register. In some such examples, the configuration register may be saved in Electrically Erasable Programmable Read-Only Memory (EEPROM), which prevents the values of the configuration register from being lost during a loss of power. During a restart, the full operating system of the software architecture 706 may avoid overwriting or restarting the specific computational resources specified by the configuration register. In some such examples, one of the computational resources identified by the bitmap is the reserved memory 712. Therefore, the reserved memory 712 remains unaffected by a restart of the example primary segment 504 during the application of the fix 408.

In some examples, the example resilient host circuitry 404 includes means for specifying computational resources in a bitmap stored in a configuration register. For example, the means for specifying may be implemented by example fix management circuitry 510. In some examples, the example fix management circuitry 510 may be implemented by machine executable instructions such as that implemented by at least blocks 1008 of FIG. 10 executed by processor circuitry, which may be implemented by the example processor circuitry 1312 of FIG. 13, the example processor circuitry 1400 of FIG. 14, and/or the example Field Programmable Gate Array (FPGA) circuitry 1500 of FIG. 15. In other examples, the example partitioner circuitry 502 is implemented by other hardware logic circuitry, hardware implemented state machines, and/or any other combination of hardware, software, and/or firmware. For example, the example partitioner circuitry 502 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 8:
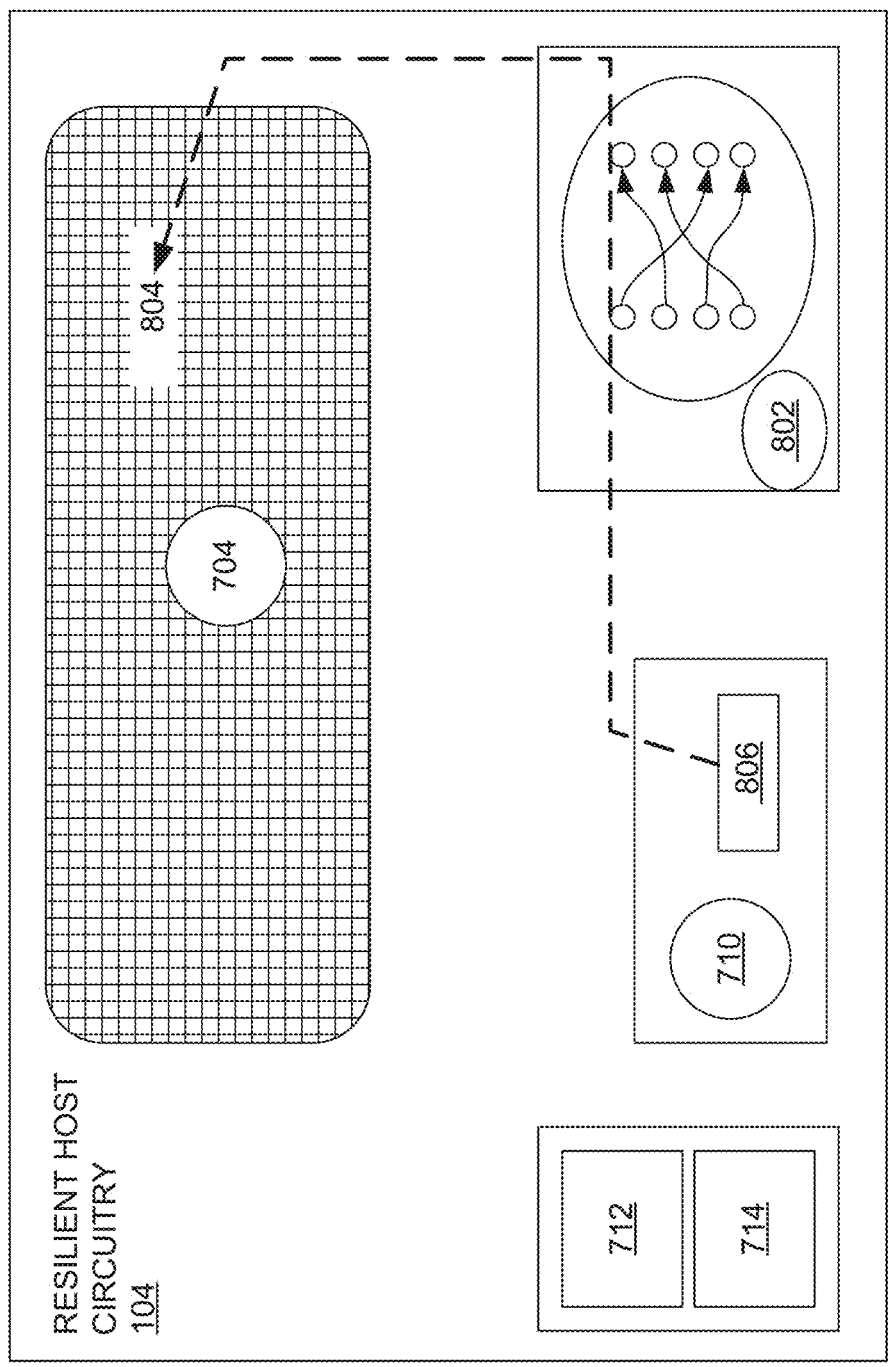
FIG. 8 is a block diagram of an example implementation of the example partition circuitry of FIG. 1

FIG. 8 is a block diagram of an example implementation of the example partitioner circuitry 502 of FIG. 4. The example implementation includes the example resilient host circuitry 404, figure includes the thin software architecture 714, processing unit 710, system physical memory 704, reserved memory 712, and example memory map 802. Additionally, the system physical memory 704 includes a first cache line 804, and the reserved memory contains a second cache line 806.

The example memory map 802 is a data structure used to associate one or more memory addresses at a cache line granularity in the system physical memory 704 with one or more memory addresses at a cache line granularity in the reserved memory 712. As used herein, a memory address at a cache line granularity may be referred to as a "cache line" for simplicity. While illustrated as a separate entity in FIG. 8 for simplicity, the example memory map 802 is stored in the reserved memory 712 and accessed by both the reserved memory 712 and the system physical memory 704 during the application of the fix 408. The thin software architecture 714 ensures that the example memory map 802 is not overwritten if the example primary segment 504 needs to restart during the application of the fix 408.

In the example implementation of FIG. 8, the fix 408 applied to the example primary segment 504 requires a change to the values of the first cache line 804, which resides in the system physical memory 704. Before the values are changed, the original values of the first cache line 804 are replicated in the second cache line 806, which resides in the reserved memory 712. In some examples, the process of copying values from the first cache line 804 to the second cache line 806 and recording the change in an example memory map 802 is referred to as copy-on-write.

When the fix 408 is applied to the example primary segment 504, the example memory map 802 records the association between the first cache line 804 and second cache line 806. By copying one or more cache lines and using the example memory map 802 to record the one or more associations, the example secondary segment 506 records the changes that occur to the memory of the example primary segment 504 during the fix 408. This example implementation is advantageous because page fault errors are prevented from occurring in the system physical memory 704, and because the amount of reserved memory 712 may be limited to including the resources for the thin software architecture 714, the example memory map 802, and the changes to the cache lines observed during the application of the fix 408.

Once the application of the fix 408 is complete, the example fix management circuitry 510 may determine if the fix 408 was successful. The fix 408 may be unsuccessful if the example primary segment 504 is less stable than the state of the example primary segment 504 before the fix 408, and/or if the example primary segment 504 is unable to communicate with the partner host circuitry 406. If the fix 408 is unsuccessful, the example fix management circuitry 510 may restore the example primary segment 504 to its previous stable state. The example restoration occurs by replacing the altered values in the first cache line 804 with the previous stable value stored in the second cache line 806, using the example memory map 802 to establish the relationship between cache lines in the system physical memory 704 and reserved memory 712. Similarly, the example fix management circuitry 510 uses the example memory map 802 to replace any additional cache lines in the system physical memory 704 that have changed due to the fix 408 back to the original value stored in the reserved memory 712. In examples where the fix 408 is successful, the second cache line 806 and any additional cache lines in the reserved memory 710 may be reclaimed for future use. This reclamation is achievable because the previous stable values stored during the application of the fix 408 are no longer needed to restore the example primary segment 506.

In some examples, copy-on-write is used before a fix is received or identified. The copy-and-write process may be used on one or more micro-services from the applications and services 708 used by the example primary segment 504 to communicate with the partner host circuitry 406. The micro-services are copied, or mirrored, from the example primary segment 504 to the example secondary segment 506. As used herein, the term "mirrored" and "copied" may be used interchangeably when referring to micro-services. In some such examples, the example secondary segment 506 uses the mirrored micro-services to continue communication with the partner host circuitry 406 if the fix 408 causes the example primary segment 504 to lose communication with the partner host circuitry 406.

In some examples, the partner host circuitry 406 or other device in the cloud 402 may request information from one of the cache lines changed by the application of the fix 408. In some such examples, the example secondary segment 506 may respond to the requests for changed cache lines at an atomic level. The atomic level response may take the form of an EBUSY or EAGAIN error, which informs the partner host circuitry 406 or other device that the example resilient host circuitry 404 is currently busy with other operations and cannot provide the requested cache line. The atomic level response may prevent the partner host circuitry 406 or other device in the cloud 402 from receiving either an outdated cache line or a prematurely modified cache line.

While an example manner of implementing the example resilient host circuitry 404 of FIG. 4 is illustrated in FIG. 5, one or more of the elements, processes, and/or devices illustrated in FIG. 5 may be combined, divided, re-arranged, omitted, eliminated, and/or implemented in any other way. Further, the example partitioner circuitry 502, the example primary segment 504, example secondary segment 506, example path finder circuitry 508, example fix management circuitry 510, and/or, more generally, the example resilient host circuitry 404 of FIG. 1, may be implemented by hardware alone or by hardware in combination with software and/or firmware. Thus, for example, any of the example partitioner circuitry 502, the example primary segment 504, example secondary segment 506, example path finder circuitry 508, example fix management circuitry 510, and/or, more generally, the example resilient host circuitry 404 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example resilient host circuitry 404 of FIG. 4 may include one or more elements, processes, and/or devices in addition to, or instead of, those illustrated in FIG. 5, and/or may include more than one of any or all of the illustrated elements, processes and devices.

A flowchart representative of example hardware logic circuitry, machine readable instructions, hardware implemented state machines, and/or any combination thereof for implementing the example resilient host circuitry 404 of FIG. 4 is shown in FIGS. 9, 10, 11, and 12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 13, many other methods of implementing the example resilient host circuitry 404 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, Hypertext Markup Language (HTML), Structured Query Language (SQL), Swift, etc.

As mentioned above, the example operations of FIGS. 9, 10, 11 and 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 9:
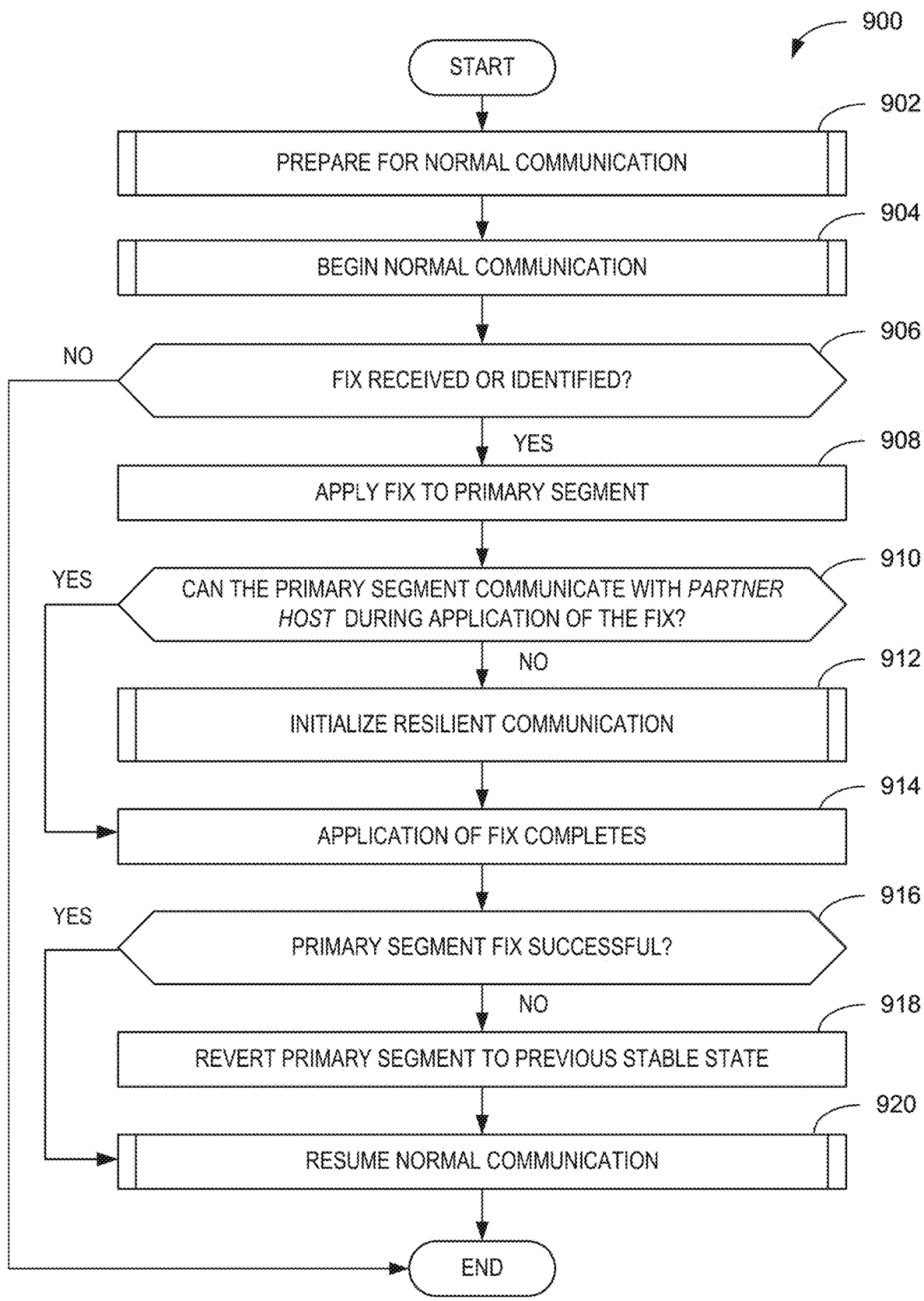
FIG. 9 is a flowchart representative of example machine readable instructions that may be executed by the resilient host circuitry of FIG. 4 to self-heal.

FIG. 9 is a flowchart representative of example machine readable instructions that may be executed by the resilient host circuitry of FIG. 4 to self-heal. The example process 900 begins when the example resilient host circuitry 404 prepares for normal communication. (Block 902). As part of normal communication, the example primary segment 504 communicates with the example resilient host circuitry 404 using the first path and the example fix management circuitry 510 takes precautionary measures.

Figure 10:
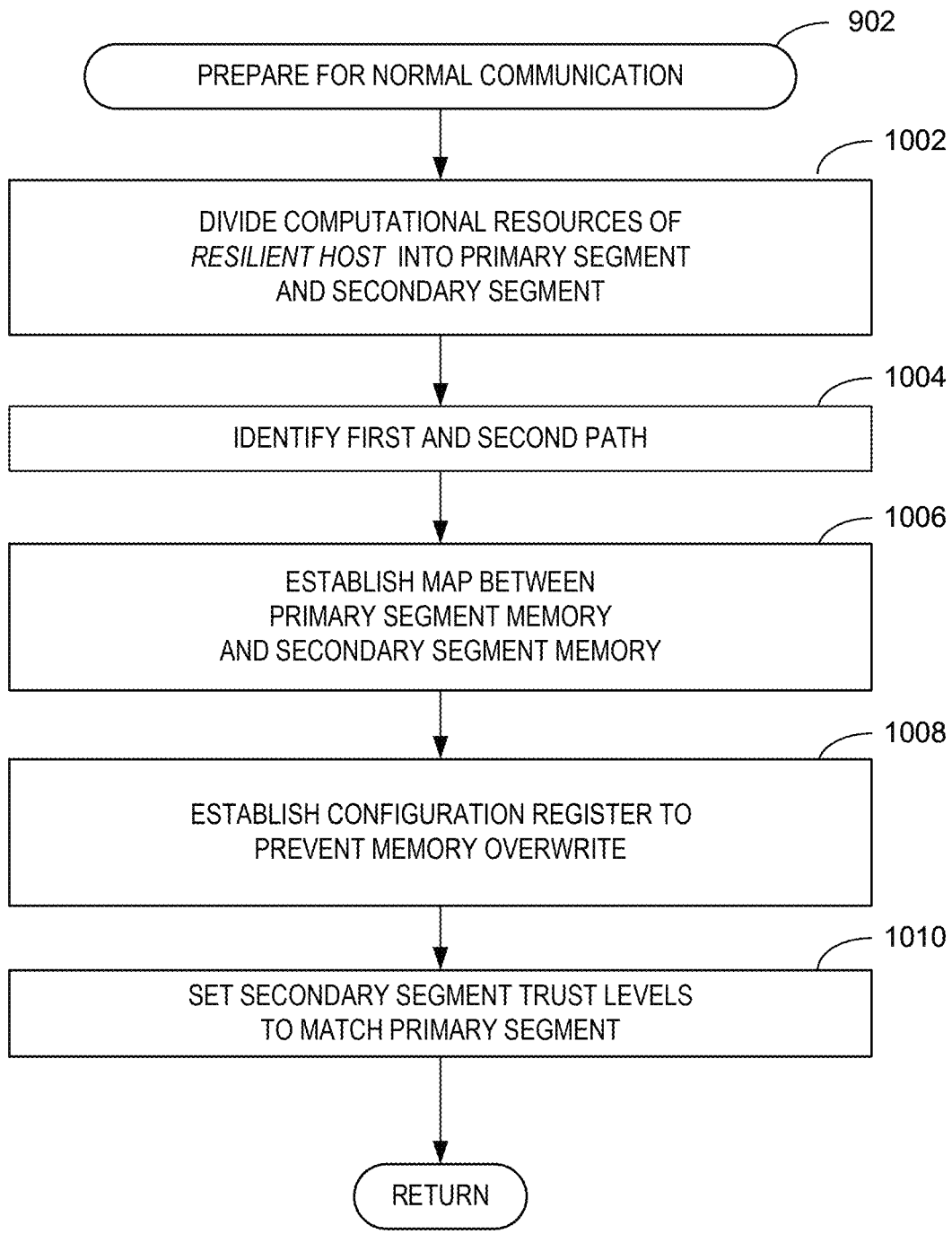
FIG. 10 is a flowchart representative of example machine readable instructions that may be executed to implement the preparation for normal communication of FIG. 9.

The preparation for normal communication described by block 902 is explored further in FIG. 10.

The example resilient host circuitry 404 begins normal communication. (Block 904). Normal communication as described by block 904 is explored further in FIG. 11.

The example fix management circuitry 510 determines if the fix 408 has been received or identified. (Block 906). If the fix 408 has not been received or identified, normal communication continues, and the example process 900 ends.

If the fix 408 has been received or identified, the example fix management circuitry 510 applies the fix 408 to the example primary segment 504. (Block 908). Application of the fix 408 may include any of the examples described previously in FIG. 4.

The example fix management circuitry 510 determines if the example primary segment 504 can communicate with the partner host circuitry 406 during the application of the fix 408. (Block 910). The example fix management circuitry 510 may make the determination of block 910 by any means. In some examples, the determination includes the example fix management circuitry 510 checking for status updates from the example primary segment 504. In some examples, the determination includes the example fix management circuitry 510 monitoring the network interface cards of the example primary segment 504 to identify transmitted packets.

Figure 11:
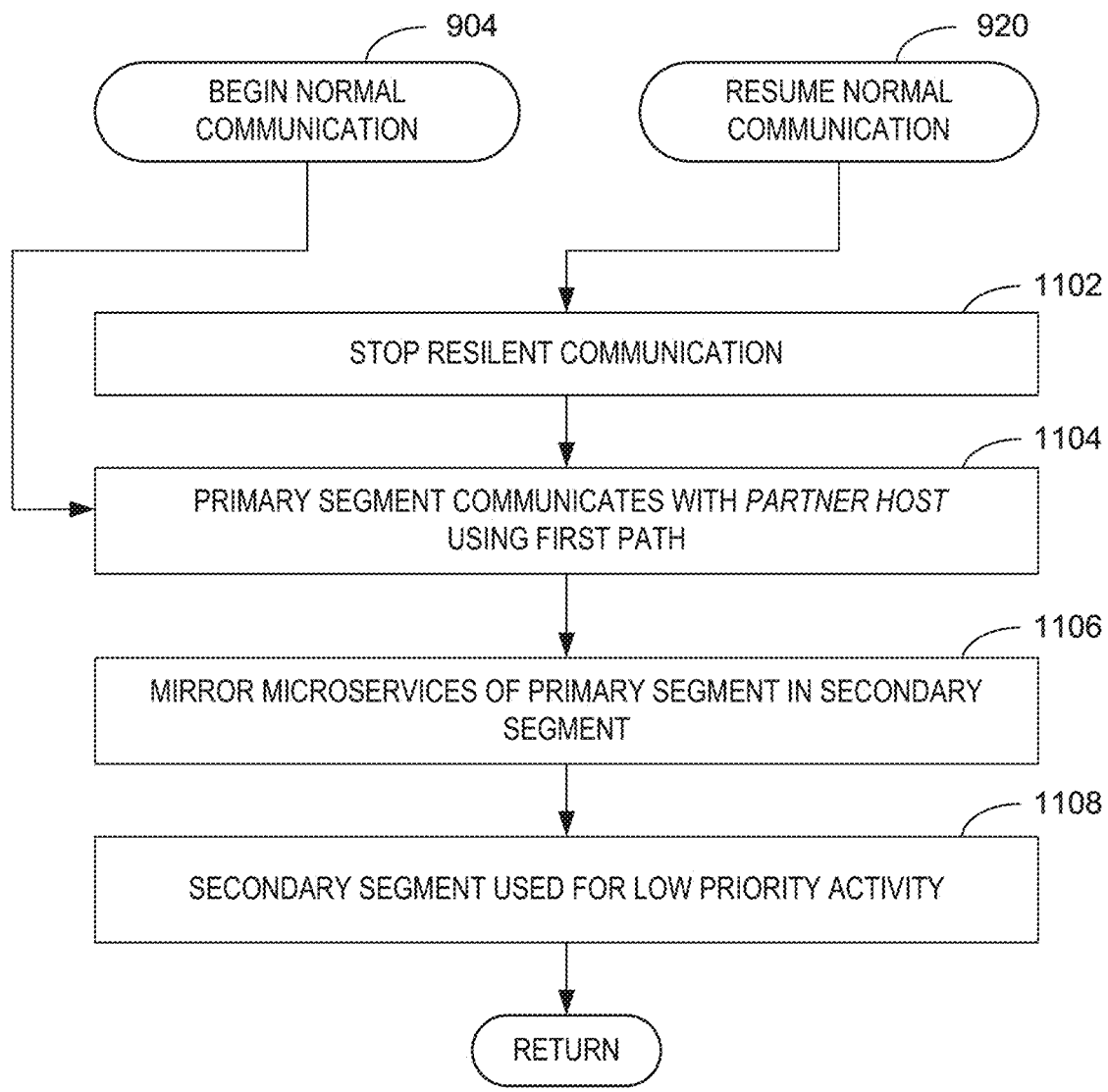
FIG. 11 is a flowchart representative of example machine readable instructions that may be executed to implement the normal communication of FIG. 9.

If the example primary segment 504 cannot communicate with the partner host circuitry 406 during the application of the fix 408, then normal communication as described in FIG. 11 has stopped. Therefore, the fix management circuitry 510 initializes resilient communication. (Block 912). As part of resilient communication, the example secondary segment 506 communicates with the example resilient host circuitry 404 using the second path. Resilient communication is explored further in FIG. 12.

Resilient communication continues until the application of the fix completes. (Block 914). If the example primary segment 504 can communicate with the partner host circuitry 406 during the application of the fix 408, the example process 900 proceeds to block 914.

The example fix management circuitry 510 determines whether the fix 408 was successful. (Block 916). In some examples, the determination described by block 916 includes testing the example primary segment 504. The example primary segment 504 can communicate with the partner host circuitry 406 after a successful fix. If the fix was successful, the example process 900 proceeds to block 920.

If the fix 408 was unsuccessful, the fix management circuitry 510 restores the example primary segment 504 to its previous stable state. (Block 918). The restoration uses the example memory map 802 to undo the changes to the example primary segment 504. In some examples, the fix 408 has adverse effects that prevents the fix management circuitry 510 from restoring the previous stable state. In some such examples, the fix management circuitry passes the values that comprise the previous stable state to another device on the cloud 402. Once the example primary segment 504 or different device have reached the previous stable state, the example primary segment 504 or different device can communicate with the partner host circuitry 406. In the example process 900, the fix management circuitry 510 is able to restore the example primary segment 504 to its previous stable state and a different device is not utilized.

The example primary segment 504 and example secondary segment 506 resume normal communication. (Block 920). During normal communication, the example primary segment 504 communicates with the partner host circuitry 406 using the first path. Normal communication is explored further in FIG. 11. The example process 900 ends once normal communication resumes.

FIG. 10 is a flowchart representative of example machine readable instructions that may be executed to implement the preparation for normal communication of FIG. 9. Implementation of the example block 902 begins when the example partitioner circuitry 502 divides the computational resources of the example resilient host circuitry 404 into an example primary segment 504 and an example secondary segment 506. (Block 1002). The division of resources may include memory resources, processing units, software architectures, applications, services, etc. The division may depend on what computational resources are available within the example resilient host circuitry, the type and content of communication with the partner host circuitry 406, and/or other tasks executed by the example resilient host circuitry 404.

The example path finder circuitry 508 identifies a first path and a second path. (Block 1004). In the example process 900, the first path is used for communication between the example primary segment 504 and the partner host circuitry 406, and the second path is used for communication between the example secondary segment 506 and the partner host circuitry 406. In some examples, the first path and the second path have one or more overlapping nodes. In some examples, the example path finder circuitry finds additional paths.

The example fix management circuitry 510 establishes the example memory map 802 between the memory resources of the example primary segment 504 and the memory resources of the example secondary segment 506. (Block 1006). In some examples, the example memory map 802 may be used to mirror the micro-services of the example primary segment 504 and store the copies in the example secondary segment 506 during normal communication. In some examples, the example memory map 802 may be additionally or alternatively be used to map the changes of the memory resources of the example primary segment 504 to the memory resources of the example secondary segment 506 during resilient communication and the application of a fix.

The example fix management circuitry 510 establishes a configuration register in the example secondary segment 506. (Block 1008). The configuration register stores a bitmap that prevents the full operating system from the software architecture 706 of the example primary segment 504 overwriting or restarting the specific computational resources specified by the configuration register during a restart. A restart is an example adverse effect that may occur during resilient communication and the application of the fix 408.

The example fix management circuitry 510 sets the trust levels of the example secondary segment 506 to match that of the example primary segment 504. (Block 1010). In some examples, matching a trust level includes setting one or more computational resources in the example secondary segment 506 to have the same security configurations of the associated computational resources of the example primary segment 504. Security configurations may include but is not limited to: encryption keys, measured re-boots, secured re-boots, root of trust, attestation protocols, authentication protocols, authorization protocols, etc. The matching of a trust level may be context specific and depend on the computational resources of the example resilient host circuitry 404.

In the example flowchart of FIG. 10, block 1004 through block 1010 are presented sequentially for simplicity. In practice, the example resilient host circuitry 404 may perform the actions described by block 1004 through block 1010 in any order. Once blocks 1002 through 1010 have been performed, block 902 has been implemented and the example process 900 proceeds to block 904.

FIG. 11 is a flowchart representative of example machine readable instructions that may be executed to implement the normal communication of FIG. 9. Specifically, the example flowchart shows how normal communication begins as described by block 904, and how normal communication resumes as described by block 920. The example process for block 920 begins when the example fix management circuitry 510 stops resilient communication. (Block 1102). As part of resilient communication, the example secondary segment 506 communicates with the example resilient host circuitry 404 using the second path. Resilient communication is explored further in FIG. 12. In block 904, when normal communication is beginning, the fix management circuitry does not execute block 1102 because the resilient communication has not yet begun.

During normal communication, the example primary segment 504 communicates with the partner host circuitry 406 using the first path. (Block 1104). In the example process, communication with the partner host circuitry 406 is the highest priority task performed by the example resilient host circuitry 404. In some examples, the example primary segment 504 additionally performs other tasks.

During normal communication, the example fix management may mirror one or more micro-services from the example primary segment 504 to the example secondary segment 506 using the example memory map 802. (Block 1106). Micro-service mapping may be context specific and depend on the specific applications and/or services being executed by the example primary segment 504.

During normal communication, the example secondary segment 506 may additionally be used for low priority tasks. (Block 1108). The performing of low priority tasks may be context specific and may depend on the number and type of tasks that the example resilient host circuitry 404 is responsible for.

In the example flowchart of FIG. 11, blocks 1104, blocks 1106, and blocks 1108 are shown sequentially for simplicity. In practice, the actions described by block 1104, block 1106, and block 1108 may be performed simultaneously. Further, while the communication described by block 1104 defines normal communication, the mirroring described by block 1106 and performing of low priority tasks described by block 1108 may not occur in some examples of normal communication. The tasks described by block 1106 and block 1108 may be context specific and depend on the conditions stated previously. Because normal communication as described by block 1104 is the default state of the example resilient host circuitry 404, normal communication continues through all steps in the example process 900 until the resilient communication is used in block 912, block 916, block 918, and block 920. Additionally, block 914 may be executed in either normal or resilient modes of communication, dependent on whether the example resilient host circuitry 404 could communicate with the partner host circuitry 406 during the application of the fix 408.

Figure 12:
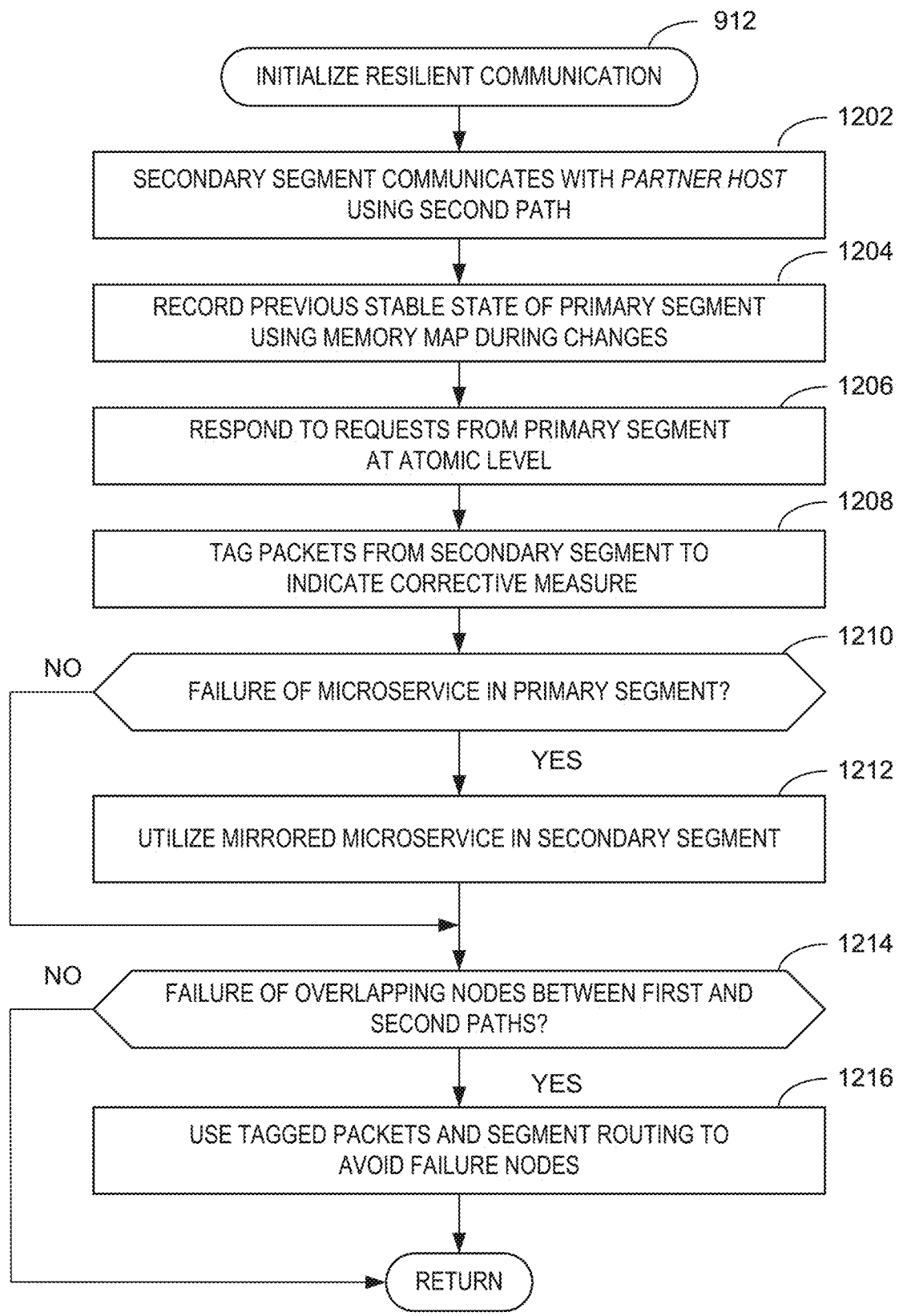
FIG. 12 is a flowchart representative of example machine readable instructions that may be executed to implement the resilient communication of FIG. 9.

FIG. 12 is a flowchart representative of example machine readable instructions that may be executed to implement the resilient communication of FIG. 9. The implementation of block 912 begins when the example secondary segment 506 communicates with the partner host circuitry 406 using the second path. (Block 1202). The communication described by block 1202 takes over the communication of the example primary segment 504. In some examples, the takeover of communication results in the example resilient host circuitry 404 being unaffected from the perspective of the partner host circuitry 406.

During resilient communication, the example fix management circuitry 510 may record the previous stable state of the memory resources of the example primary segment 504 in the memory resources of the example secondary segment 506 using the example memory map 802. (Block 1204). The recording occurs during a change of the memory resources of the example primary segment 504 and as part of the application of the fix 408.

During the recording of the previous stable state as described by block 1204, the example secondary segment 506 may respond to requests for changed cache lines at an atomic level (Block 1206). The atomic level response may take the form of an EBUSY or EAGAIN error. The atomic level response may prevent the partner host circuitry 406 or other device in the cloud 402 from receiving an outdated cache line.

During resilient communication, the fix management circuitry 510 may tag packets sent by the example secondary segment 506. (Block 1208). The tagged packets indicate that the fix 408 is being applied to the example primary segment 504 and may be used if a path failure occurs.

During resilient communication, the example fix management circuitry 510 determines if a micro-service has failed in the example primary segment 504. (Block 1210). In some examples, the determination described by block 1210 may include sending a status message or health inquiry to the example primary segment 504. If a micro-service has failed in the example primary segment 504, the example fix management circuitry 510 utilizes the mirrored micro-service stored in the example secondary segment 506. (Block 1212). The mirrored micro-service may be used by the example primary segment 504 if the adverse effects of the fix 408 are limited to the failed micro-service. In some examples, the mirrored micro-service may be used by the example secondary segment 506 if the example primary segment 504 experiences additional adverse effects that limit its ability to use the micro-service properly.

During resilient communication, the example fix management circuitry 510 determines if there is a failure of overlapping nodes between the first path and the second path (Block 1214). If there is a failure of nodes as described by block 1214, the example fix management circuitry 510 uses tagged packets and segment routing techniques to avoid the failed nodes. (Block 1216). In some examples, the segment routing techniques include the Internet Protocol version 6 Segment Routing Header (IPv6 SRH).

In the example flowchart of FIG. 12, blocks 1202 through blocks 1216 are shown sequentially for simplicity. In practice, the actions described by block 1202, block 1204, block 1206, block 1208, block 1210, and block 1214 may occur simultaneously. However, block 1212, if executed, occurs after a YES response to block 1210. Similarly, block 1216, if executed, occurs after a YES response to block 1214. Furthermore, while the communication described by block 1202 defines resilient communication, blocks 1204 through block 1216 may not be executed in some examples. The application of blocks 1204 through blocks 1216 is context specific and may depend on the resources of the example resilient host circuitry 404, the applications and services running on the example primary segment 504, and the type of communication with the partner host circuitry 406. Resilient communication as described by FIG. 12 continues in the example resilient host circuitry 404 until the example primary segment 504 can resume communication with the partner host circuitry 406.

Figure 13:
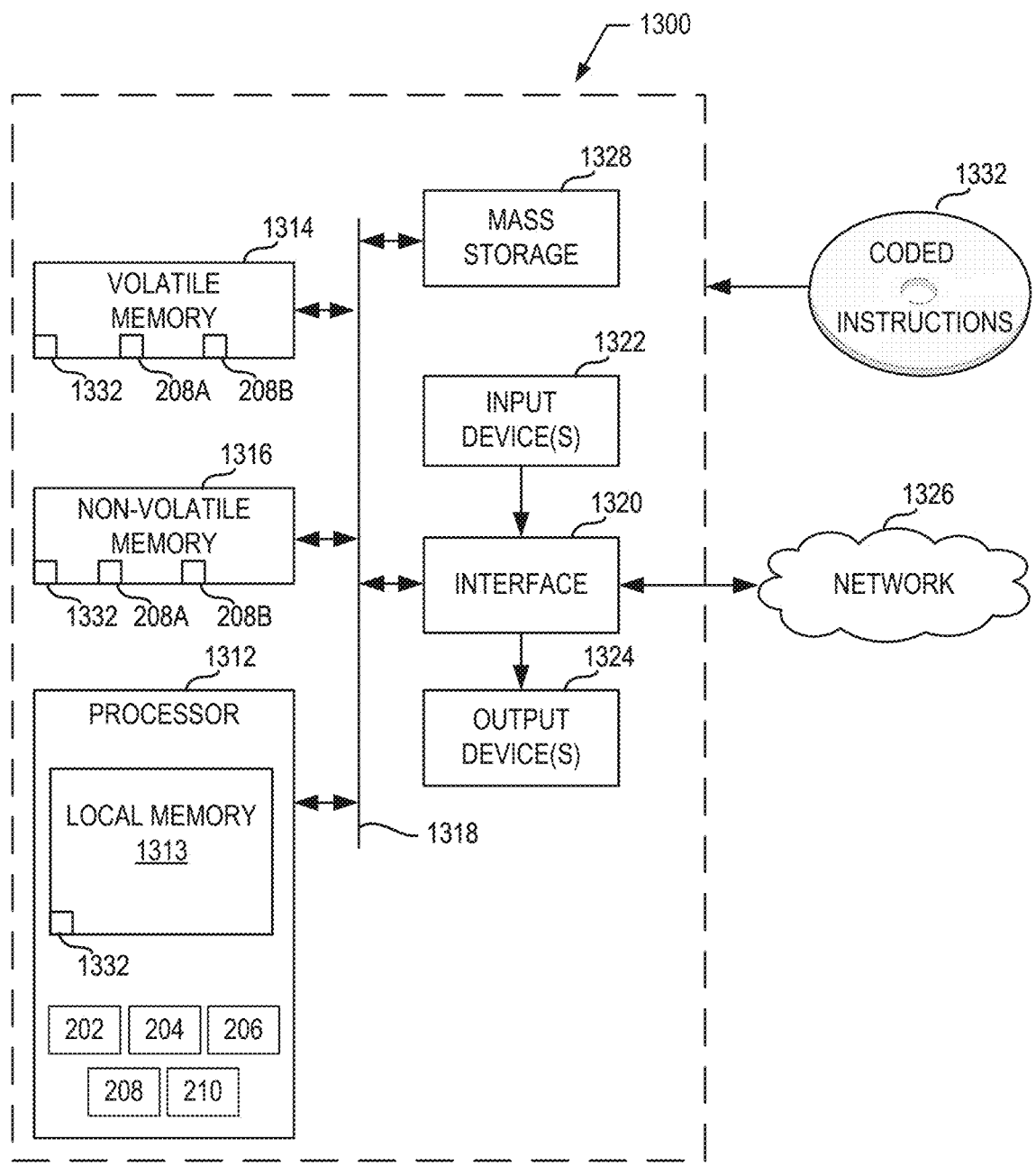
FIG. 13 is a block diagram of an example processing platform including processor circuitry structured to execute the example machine readable instructions of FIGS. 9-12 to implement the resilient self-healing mechanism of FIG. 4.

FIG. 13 is a block diagram of an example processor platform 1300 structured to execute and/or instantiate the machine readable instructions and/or operations of FIGS. 9, 10, 11 and 12 to implement the example resilient host circuitry 404 of FIG. 4. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements example partitioner circuitry 502, example path finder circuitry 508, example fix management circuitry 510, processing units 702, and processing unit 710.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIGS. 9, 10, 11 and 12, may be stored in the mass storage device 1328, in the volatile memory 1314, in the non-volatile memory 1316, and/or on a removable non-transitory computer readable storage medium such as a CD or DVD.

Figure 14:
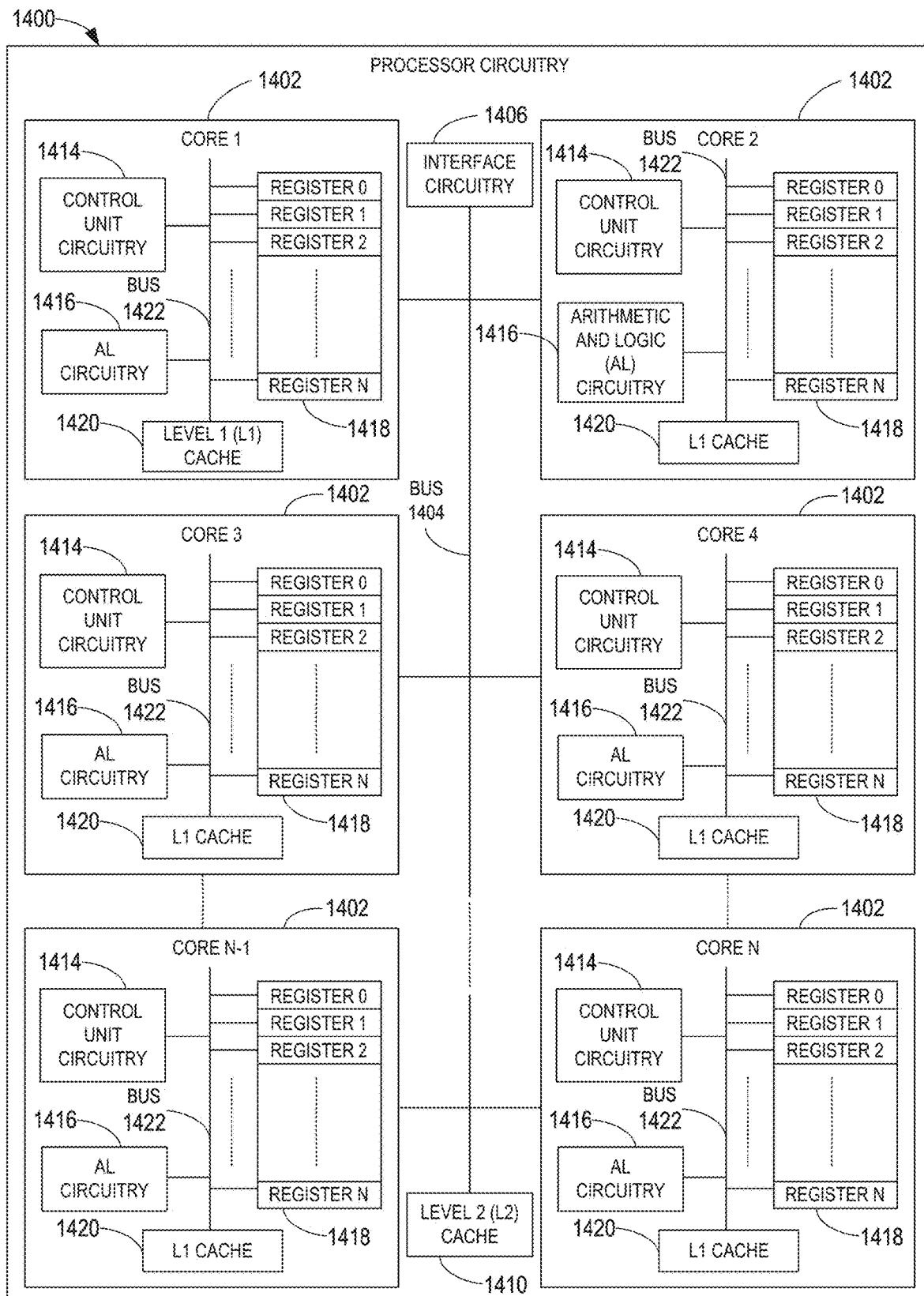
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowchart of FIGS. 9, 10, 11 and 12.

The cores 1402 may communicate by an example bus 1404. In some examples, the bus 1404 may implement a communication bus to effectuate communication associated with one(s) of the cores 1402. For example, the bus 1404 may implement at least one of an Inter-Integrated Circuit (I2C) bus, a Serial Peripheral Interface (SPI) bus, a PCI bus, or a PCIe bus. Additionally or alternatively, the bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 11020 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The bus 1420 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
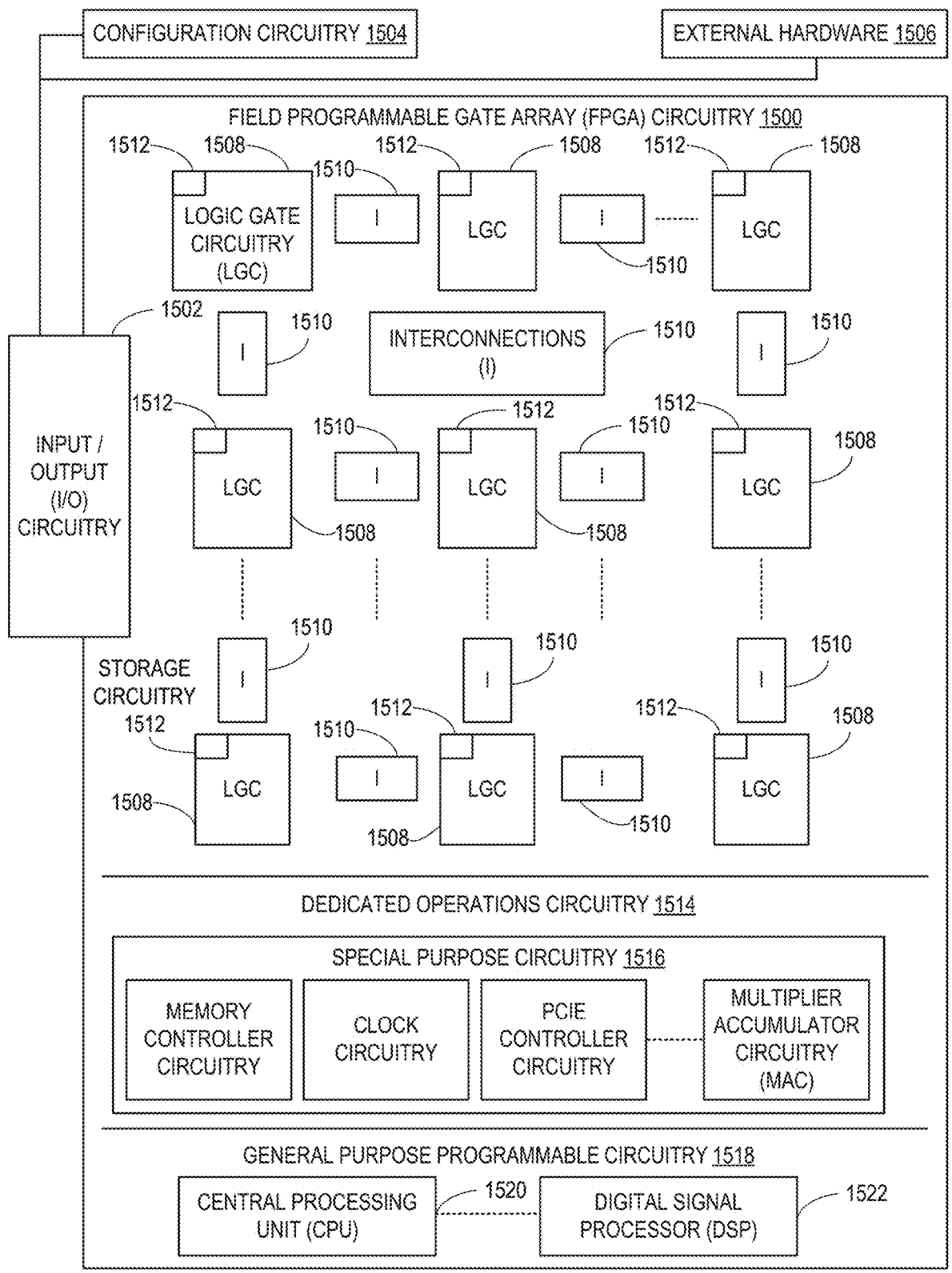
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowchart of FIGS. 9, 10, 11 and 12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowchart of FIGS. 9, 10, 11 and 12. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowchart of FIGS. 9, 10, 11 and 12. As such, the FPGA circuitry 1500 may be structured to effectively instantiate some or all of the machine readable instructions of the flowchart of FIGS. 9, 10, 11 and 12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 15 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIGS. 9, 10, 11 and 12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowchart of FIGS. 9, 10, 11 and 12 may be executed by one or more of the cores 1402 of FIG. 14 and a second portion of the machine readable instructions represented by the flowchart of FIGS. 9, 10, 11 and 12 may be executed by the FPGA circuitry 1500 of FIG. 15.

In some examples, the processor circuitry 1312 of FIG. 13 may be in one or more packages. For example, the processor circuitry 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
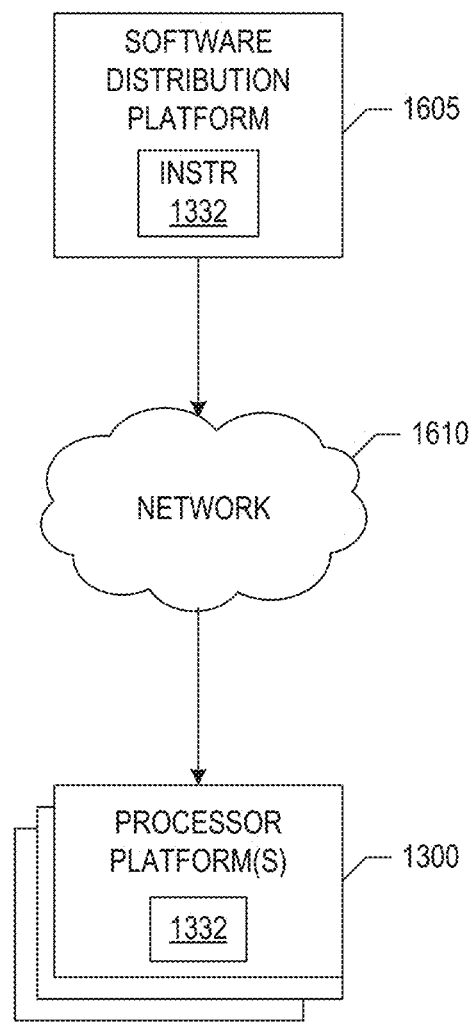
FIG. 16 is a block diagram of an example software distribution platform (e.g., one or more servers) to distribute software (e.g., software corresponding to the example machine readable instructions of FIGS. 9-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions of FIGS. 9, 10, 11 and 12, as described above. The one or more servers of the example software distribution platform 1605 are in communication with a network 1610, which may correspond to any one or more of the Internet and/or any of the example networks 402 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions of FIGS. 9, 10, 11 and 12, may be downloaded to the example processor platform 1300, which is to execute the machine readable instructions 1332 to implement the example resilient host circuitry 404. In some example, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that increase the resiliency in self-healing mechanisms. The disclosed systems, methods, apparatus, and articles of manufacture improve the efficiency of using a computing device by partitioning the resources of the self-healing mechanism into a primary segment and a secondary segment, allowing the secondary segment to continue communication while a fix with potentially adverse effects is applied to the primary segment. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to increase resiliency in self-healing mechanisms are disclosed herein. Further examples and combinations thereof include the following:

Example 1 includes an apparatus to improve resiliency in self-healing mechanisms comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate partitioner circuitry to partition computational resources of a first host into a primary segment and a secondary segment, the primary segment to communicate with a second host, fix management circuitry to apply a fix for the primary segment, determine if the primary segment can communicate with the second host during the application of the fix, cause, in response to the determination that the primary segment cannot communicate with the second host during the application of the fix, the secondary segment to communicate with the second host, and transfer communication with the second host from the secondary segment to the primary segment, the transfer in response to a determination that the application of the fix is complete.

Example 2 includes the apparatus of example 1, further including path finder circuitry to find a first path and to find a second path, the primary segment to communicate with the second host using the first path, the secondary segment to communicate with the second host using the second path.

Example 3 includes the apparatus of example 2, wherein the first path and the second path share an overlapping node.

Example 4 includes the apparatus of example 3, wherein the fix management circuitry is further to cause the secondary segment to tag packets used in communication between the primary segment and the second host.

Example 5 includes the apparatus of example 4, wherein the path finder circuitry is further to find a third path, the third path found using the tagged packets and segment routing techniques to avoid the overlapping node, the secondary segment to communicate with the second host using the third path in response to the overlapping node failing.

Example 6 includes the apparatus of example 2, wherein the secondary segment is a device on the second path, the device on the second path to connect wirelessly to the first host.

Example 7 includes the apparatus of example 6, wherein the device on the second path utilizes a Transmission Control Protocol/Internet Protocol model and includes Multi-Radio Access Technology Dual connectivity at a Data Link Layer.

Example 8 includes the apparatus of example 1, wherein the secondary segment is to perform low priority tasks when the primary segment is to communicate with the second host.

Example 9 includes the apparatus of example 8, wherein the transfer of communication with the second host to the primary segment further includes the secondary segment to resume low priority tasks.

Example 10 includes the apparatus of example 1, wherein the fix management circuitry is further to create a map of changes made to a memory resource of the primary segment during the application of the fix, the map of changes stored in a memory resource of the secondary segment.

Example 11 includes the apparatus of example 10, wherein the determination that the application of the fix is complete further includes a determination of whether the fix is successful.

Example 12 includes the apparatus of example 11, wherein the fix management circuitry is further to restore the primary segment to its previous stable state, the restoration in response to the determination that the fix is not successful, the restoration using the map of changes stored in the memory resource of the secondary segment.

Example 13 includes the apparatus of example 1, wherein the application of the fix for the primary segment further includes a restart of the primary segment.

Example 14 includes the apparatus of example 13, wherein the fix management circuitry is further to specify the computational resources in a bitmap stored in a configuration register, the configuration register to prevent an operating system of the primary segment from a restart or overwrite of the specified computational resources of the secondary segment during a restart of the primary segment.

Example 15 includes the apparatus of example 1, wherein the fix management circuitry is further to respond to a request from the primary segment at an atomic level, the response occurring while the secondary segment is to communicate with the second host.

Example 16 includes the apparatus of example 1, further including mirroring an application micro-service from the primary segment to the secondary segment.

Example 17 includes the apparatus of example 16, wherein the fix management circuitry is further to apply utilize the mirrored application micro-service in the secondary segment, the utilization in response to a failure of the application micro-service in the primary segment during the application of the fix.

Example 18 includes the apparatus of example 1, wherein the secondary segment is a partition of a third host, the first host to communicate with the third host through a shared memory pool.

Example 19 includes the apparatus of example 1, wherein the computational resources of the primary segment further include a first amount of execution resources and the computational resources of the secondary segment further include a second amount of execution resources, the first amount of execution resources greater than the second amount of execution resources, the second amount of execution resources to include simultaneous multithreading.

Example 20 includes the apparatus of example 1, wherein to cause the secondary segment to communicate with the second host, the fix management circuitry is further to match a trust level of the secondary segment to a trust level of the primary segment.

Example 21 includes At least one non-transitory machine-readable medium comprising instructions that, when executed, cause at least one processor to at least partition computational resources of a first host into a primary partition and a shadow partition, the primary partition to communicate with a second host, apply a fix for the primary partition, determine if the primary partition can communicate with the second host during the application of the fix, cause, in response to the determination that the primary partition cannot communicate with the second host during the application of the fix, the shadow partition to communicate with the second host, and transfer communication with the second host from the shadow partition to the primary partition, the transfer in response to a determination that the application of the fix is complete.

Example 22 includes the at least one non-transitory machine-readable medium of example 21, wherein the instructions, when executed, cause at least one processor to find a first path and to find a second path, the primary partition to communicate with the second host using the first path, the shadow partition to communicate with the second host using the second path.

Example 23 includes the at least one non-transitory machine-readable medium of example 22, wherein the first path and the second path share an overlapping node.

Example 24 includes the at least one non-transitory machine-readable medium of example 23, wherein the instructions, when executed, cause the at least one processor to cause the shadow partition to tag packets used in communication between the primary partition and the second host.

Example 25 includes the at least one non-transitory machine-readable medium of example 24, wherein the instructions, when executed, cause the at least one processor to find a third path, the third path found using the tagged packets and segment routing techniques to avoid the overlapping node, the shadow partition to communicate with the second host using the third path in response to the overlapping node failing.

Example 26 includes the at least one non-transitory machine-readable medium of example 22, wherein the shadow partition is a device on the second path, the device on the second path to connect wirelessly to the first host.

Example 27 includes the at least one non-transitory machine-readable medium of example 26, wherein the second path utilizes a Transmission Control Protocol/Internet Protocol model and includes Multi-Radio Access Technology Dual connectivity at a Data Link Layer.

Example 28 includes the at least one non-transitory machine-readable medium of example 21, wherein the shadow partition performs low priority tasks when the primary partition is communicating with the second host.

Example 29 includes the at least one non-transitory machine-readable medium of example 28, wherein the transfer of communication with the second host to the primary partition further includes the shadow partition resuming the low priority tasks.

Example 30 includes the at least one non-transitory machine-readable medium of example 21, wherein the instructions, when executed, cause the at least one processor to create a map of changes made to a memory resource of the primary partition during the application of the fix, the map of changes stored in a memory resource of the shadow partition.

Example 31 includes the at least one non-transitory machine-readable medium of example 30, wherein the instructions, when executed, cause the at least one processor to determining if the fix is successful, the determination if the fix is successful in response to the determination if the application of the fix is complete.

Example 32 includes the at least one non-transitory machine-readable medium of example 31, wherein the instructions, when executed, cause the at least one processor to restore the primary partition to its previous stable state, the restoration in response to the determination that the fix is not successful, the restoring using the map of changes stored in the memory resource of the shadow partition.

Example 33 includes the at least one non-transitory machine-readable medium of example 21, wherein the application of the fix for the primary partition further includes a restart of the primary partition.

Example 34 includes the at least one non-transitory machine-readable medium of example 33, wherein the instructions, when executed, cause the at least one processor to specify computational resources in a bitmap stored in a configuration register, the configuration register to prevent an operating system of the primary partition from restarting or overwriting the specified computational resources of the shadow partition during a restart of the primary partition.

Example 35 includes the at least one non-transitory machine-readable medium of example 21, wherein the instructions, when executed, cause the at least one processor to respond to a request from the primary partition at an atomic level, the response occurring when the shadow partition communicates with the second host.

Example 36 includes the at least one non-transitory machine-readable medium of example 21, wherein the instructions, when executed, cause the at least one processor to mirror an application micro-service from the primary partition to the shadow partition.

Example 37 includes the at least one non-transitory machine-readable medium of example 36, wherein the instructions, when executed, cause the at least one processor to utilize the mirrored application micro-service in the shadow partition, the utilization in response to a failure of the application micro-service in the primary partition during the application of the fix.

Example 38 includes the at least one non-transitory machine-readable medium of example 21, wherein the shadow partition is a partition of a third host, the first host communicating with the third host using a shared memory pool.

Example 39 includes the at least one non-transitory machine-readable medium of example 21, wherein the computational resources of the primary partition further include a first amount of execution resources and the computational resources of the shadow partition further include a second amount of execution resources, the first amount of execution resources being greater than the second amount of execution resources, the second amount of execution resources including simultaneous multithreading.

Example 40 includes the at least one non-transitory machine-readable medium of example 21, wherein the instructions, when executed, cause the at least one processor to match a trust level of the shadow partition to a trust level of the primary partition.

Example 41 includes a method to increase resiliency in self-healing mechanisms comprising partitioning computational resources of a first host into a primary portion and a backup portion, the primary portion communicating with a second host, applying a fix for the primary portion, determining if the primary portion can communicate with the second host during the application of the fix, causing, in response to the determination that the primary portion cannot communicate with the second host during the application of the fix, the backup portion to communicate with the second host, and transferring communication with the second host from the backup portion to the primary portion, the transferring in response to a determination that the application of the fix is complete.

Example 42 includes the method of example 41, further including finding a first path and a second path, the primary portion communicating with the second host using the first path, the backup portion communicating with the second host using the second path.

Example 43 includes the method of example 42, wherein the first path and the second path share an overlapping node.

Example 44 includes the method of example 43, further including causing the backup portion to tag packets used in communication between the primary portion and the second host.

Example 45 includes the method of example 44, further including finding a third path, the third path found using the tagged packets and segment routing techniques to avoid the overlapping node, the backup portion to communicate with the second host using the third path in response to the overlapping node failing.

Example 46 includes the method of example 42, wherein the backup portion is a device on the second path, the device on the second path connecting wirelessly to the first host.

Example 47 includes the method of example 46, wherein the second path utilizes a Transmission Control Protocol/Internet Protocol model and includes Multi-Radio Access Technology Dual connectivity at a Data Link Layer.

Example 48 includes the method of example 41, further including the backup portion performing low priority tasks when the primary portion is communicating with the second host.

Example 49 includes the method of example 48, wherein transferring communication with the second host to the primary portion further includes the backup portion resuming the low priority tasks.

Example 50 includes the method of example 41, further including creating a map of changes made to a memory resource of the primary portion during the application of the fix, the map of changes stored in a memory resource of the backup portion.

Example 51 includes the method of example 50, wherein determining if the application of the fix is complete further includes determining if the fix is successful.

Example 52 includes the method of example 51, further including restoring the primary portion to its previous stable state, the restoring in response to the determination that the fix is not successful, the restoring using the map of changes stored in the memory resource of the backup portion.

Example 53 includes the method of example 41, wherein applying a fix for the primary portion further includes restarting the primary portion.

Example 54 includes the method of example 53, wherein applying the fix to the primary portion further incudes specifying computational resources in a bitmap stored in a configuration register, the configuration register to prevent an operating system of the primary portion from restarting or overwriting the specified computational resources of the backup portion during a restart of the primary portion.

Example 55 includes the method of example 41, wherein causing the backup portion to communicate with the second host further includes the backup portion responding to a request from the primary portion at an atomic level.

Example 56 includes the method of example 41, further including mirroring an application micro-service from the primary portion to the backup portion.

Example 57 includes the method of example 56, wherein applying the fix to the primary portion further includes utilizing the mirrored application micro-service in the backup portion, the utilization in response to a failure of the application micro-service in the primary portion during the application of the fix.

Example 58 includes the method of example 41, wherein the backup portion is a partition of a third host, the first host communicating with the third host using a shared memory pool.

Example 59 includes the method of example 41, wherein the computational resources of the primary portion further include a first amount of execution resources and the computational resources of the backup portion further include a second amount of execution resources, the first amount of execution resources being greater than the second amount of execution resources, the second amount of execution resources including simultaneous multithreading.

Example 60 includes the method of example 41, wherein causing the backup portion to communicate with the second host further includes matching a trust level of the backup portion to a trust level of the primary portion.

Example 61 includes an apparatus to increase resiliency in self-healing mechanisms comprising means for partitioning computational resources of a first host into a primary division and a watch dog division, the primary division communicating with a second host, means for applying a fix for the primary division, means for determining if the primary division can communicate with the second host during the application of the fix, means for causing, in response to the determination that the primary division cannot communicate with the second host during the application of the fix, the watch dog division to communicate with the second host, and means for transferring communication with the second host from the watch dog division to the primary division, the transferring in response to a determination that the application of the fix is complete.

Example 62 includes the apparatus of example 61, further including means for finding a first path and means for finding a second path, the primary division communicating with the second host using the first path, the watch dog division to communicating with the second host using the second path.

Example 63 includes the apparatus of example 62, wherein the first path and the second path share an overlapping node.

Example 64 includes the apparatus of example 63, further including means for causing the watch dog division to tag packets that the primary division used in communication between the primary division and the second host.

Example 65 includes the apparatus of example 64, further including means for finding a third path, the third path found using the tagged packets and segment routing techniques to avoid the overlapping node, the watch dog division to communicate with the second host using the third path in response to the overlapping node failing.

Example 66 includes the apparatus of example 62, wherein the watch dog division is a device on the second path, the device on the second path further including means for connecting wirelessly to the first host.

Example 67 includes the apparatus of example 66, further including means for the second path utilizing a Transmission Control Protocol/Internet Protocol model and Multi-Radio Access Technology Dual connectivity at a Data Link Layer.

Example 68 includes the apparatus of example 61, further including means for the watch dog division performing low priority tasks when the primary division is communicating with the second host.

Example 69 includes the apparatus of example 68, wherein transferring communication with the second host to the primary division further includes means for the watch dog division resuming the low priority tasks.

Example 70 includes the apparatus of example 61, further including creating a map of changes made to a memory resource of the primary division during the application of the fix, the map of changes stored in a memory resource of the watch dog division.

Example 71 includes the apparatus of example 70, wherein determining if the application of the fix is complete further includes determining if the fix is successful.

Example 72 includes the apparatus of example 71, further including restoring the primary division to its previous stable state, the restoring in response to the determination that the fix is not successful, the restoring using the map of changes stored in the memory resource of the watch dog division.

Example 73 includes the apparatus of example 61, wherein the means for applying a fix for the primary division further includes restarting the primary division.

Example 74 includes the apparatus of example 73, wherein the means for applying the fix to the primary division further incudes specifying computational resources in a bitmap stored in a configuration register, the configuration register to prevent an operating system of the primary division from restarting or overwriting the specified computational resources of the watch dog division during a restart of the primary division.

Example 75 includes the apparatus of example 61, wherein the means for causing the watch dog division to communicate with the second host further includes means for the watch dog division responding to a request from the primary division at an atomic level.

Example 76 includes the apparatus of example 61, further including means for mirroring an application micro-service from the primary division to the watch dog division.

Example 77 includes the apparatus of example 76, wherein the means for applying the fix to the primary division further includes means for utilizing the mirrored application micro-service in the watch dog division, the utilization in response to a failure of the application micro-service in the primary division during the application of the fix.

Example 78 includes the apparatus of example 61, wherein the watch dog division is a partition of a third host, and further including means for the first host communicating with the third host using a shared memory pool.

Example 79 includes the apparatus of example 61, wherein the computational resources of the primary division further include a first amount of execution resources and the computational resources of the watch dog division further include a second amount of execution resources, the first amount of execution resources being greater than the second amount of execution resources, the second amount of execution resources including simultaneous multithreading.

Example 80 includes the apparatus of example 61, wherein the means for causing the watch dog division to communicate with the second host further includes means for matching a trust level of the watch dog division to a trust level of the primary division.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to improve resiliency in self-healing mechanisms, the apparatus comprising:
   interface circuitry;
   machine readable instructions; and
   processor circuitry to at least one of instantiate or execute the machine readable instructions to:
      partition computational resources of a first host into a primary segment and a secondary segment, the primary segment to communicate with a second host;
      apply a fix for the primary segment;
      create a map of changes made to a memory resource of the primary segment during the application of the fix, the map of changes stored in a memory resource of the secondary segment;
      determine if the primary segment can communicate with the second host during the application of the fix;
      cause, after a determination that the primary segment cannot communicate with the second host during the application of the fix, the secondary segment to communicate with the second host;
      restore the primary segment to its previous stable state after a determination the application of the fix is complete and after a determination the fix is not successful, the restoration using the map of changes stored in the memory resource of the secondary segment; and
      transfer communication with the second host from the secondary segment to the primary segment after the restoration of the primary segment to its previous state.

2. The apparatus of claim 1, wherein the processor circuitry is further to find a first path and to find a second path, the primary segment to communicate with the second host using the first path, the secondary segment to communicate with the second host using the second path.

3. The apparatus of claim 2, wherein the first path and the second path share an overlapping node.

4. The apparatus of claim 3, wherein the processor circuitry is further to cause the secondary segment to tag packets used in communication between the primary segment and the second host.

5. The apparatus of claim 4, wherein the processor circuitry is further to find a third path, the third path found using the tagged packets and segment routing techniques to avoid the overlapping node, the secondary segment to communicate with the second host using the third path in response to the overlapping node failing.

6. The apparatus of claim 2, wherein the secondary segment is a device on the second path, the device on the second path to connect wirelessly to the first host.

7. The apparatus of claim 6, wherein the device on the second path utilizes a Transmission Control Protocol/Internet Protocol model and includes Multi-Radio Access Technology Dual connectivity at a Data Link Layer.

8. The apparatus of claim 1, wherein the secondary segment is to perform low priority tasks when the primary segment is to communicate with the second host.

9. The apparatus of claim 8, wherein the transfer of communication with the second host to the primary segment further includes the secondary segment to resume low priority tasks.

10. The apparatus of claim 1, wherein the application of the fix for the primary segment further includes a restart of the primary segment.

11. The apparatus of claim 10, wherein the processor circuitry is further to specify the computational resources in a bitmap stored in a configuration register, the configuration register to prevent an operating system of the primary segment from a restart or overwrite of the specified computational resources of the secondary segment during a restart of the primary segment.

12. The apparatus of claim 1, wherein the fix management processor circuitry is further to respond to a request from the primary segment at an atomic level, the response occurring while the secondary segment is to communicate with the second host.

13. The apparatus of claim 1, wherein the processor circuitry is further including mirroring to mirror an application micro-service from the primary segment to the secondary segment.

14. The apparatus of claim 13, wherein the fix management processor circuitry is further to apply utilize the mirrored application micro-service in the secondary segment, the utilization in response to a failure of the application micro- service in the primary segment during the application of the fix.

15. The apparatus of claim 1, wherein the secondary segment is a partition of a third host, the first host to communicate with the third host through a shared memory pool.

16. The apparatus of claim 1, wherein the computational resources of the primary segment further include a first amount of execution resources and the computational resources of the secondary segment further include a second amount of execution resources, the first amount of execution resources greater than the second amount of execution resources, the second amount of execution resources to include simultaneous multithreading.

17. The apparatus of claim 1, wherein to cause the secondary segment to communicate with the second host, the processor circuitry is further to match a trust level of the secondary segment to a trust level of the primary segment.

18. At least one non-transitory machine-readable medium comprising instructions that, when executed, cause at least one processor to at least:
   partition computational resources of a first host into a primary partition and a shadow partition, the primary partition to communicate with a second host;
   apply a fix for the primary partition;
   create a map of changes made to a memory resource of the primary partition during the application of the fix, the map of changes stored in a memory resource of the shadow partition;
   determine if the primary partition can communicate with the second host during the application of the fix;
   cause, after a determination that the primary partition cannot communicate with the second host during the application of the fix, the shadow partition to communicate with the second host;
   restore the primary partition to its previous stable state after a determination the application of the fix is complete and after a determination the fix is not successful, the restoration using the map of changes stored in the memory resource of the shadow partition; and
   transfer communication with the second host from the shadow partition to the primary partition after the restoration of the primary partition to its previous state.

19. The at least one non-transitory machine-readable medium of claim 18, wherein the instructions, when executed, cause at least one processor to find a first path and to find a second path, the primary partition to communicate with the second host using the first path, the shadow partition to communicate with the second host using the second path.

20. The at least one non-transitory machine-readable medium of claim 19, wherein the first path and the second path share an overlapping node.

21. A method to increase resiliency in self-healing mechanisms comprising:
   partitioning computational resources of a first host into a primary portion and a backup portion, the primary portion communicating with a second host;
   applying a fix for the primary portion;
   creating a map of changes made to a memory resource of the primary portion during the application of the fix, the map of changes stored in a memory resource of the backup portion;
   determining if the primary portion can communicate with the second host during the application of the fix;
   causing, after a determination that the primary portion cannot communicate with the second host during the application of the fix, the backup portion to communicate with the second host;
   restoring the primary portion to its previous stable state after determining the application of the fix is complete and after determining the fix is not successful, the restoration using the map of changes stored in the memory resource of the backup portion; and
   transferring communication with the second host from the backup portion to the primary portion after the restoration of the primary portion to its previous state.

22. An apparatus to increase resiliency in self-healing mechanisms, the apparatus comprising:
   means for partitioning computational resources of a first host into a primary division and a watch dog division, the primary division communicating with a second host;

means for applying a fix for the primary division;

means for creating a map of changes made to a memory resource of the primary division during the application of the fix, the map of changes stored in a memory resource of the watch dog division;

means for determining if the primary division can communicate with the second host during the application of the fix;

means for causing, after a determination that the primary division cannot communicate with the second host during the application of the fix, the watch dog division to communicate with the second host;

means for restoring the primary division to its previous stable state after a determination the application of the fix is complete and after a determination the fix is not successful, the restoration using the map of changes stored in the memory resource of the watch dog division; and means for transferring communication with the second host from the watch dog division to the primary division after the restoration of the primary division to its previous state.

23. The method of claim 21, including finding a first path and a second path, the primary portion communicating with the second host using the first path, the backup portion communicating with the second host using the second path.

24. The apparatus of claim 22, further including means for finding a first path and means for finding a second path, the primary division communicating with the second host using the first path, the watch dog division to communicating with the second host using the second path.

25. The apparatus of claim 24, wherein the first path and the second path share an overlapping node.

* * * * *

UNITED STATES PATENT AND TRADEMARK OFFICE
CERTIFICATE OF CORRECTION

PATENT NO. : 12,399,781 B2
APPLICATION NO. : 17/484951
DATED : August 26, 2025
INVENTOR(S) : Doshi et al.

Page 1 of 1

It is certified that error appears in the above-identified patent and that said Letters Patent is hereby corrected as shown below:

In the Claims

Column 39, Claim 12, Line 37, delete "fix management".
Column 39, Claim 13, Line 43, delete "including mirroring".
Column 39, Claim 14, Line 46, delete "fix management".

Signed and Sealed this
Twenty-third Day of September, 2025

John A. Squires
*Director of the United States Patent and Trademark Office*